(12) United States Patent
Naviasky et al.

(10) Patent No.: US 9,405,314 B1
(45) Date of Patent: Aug. 2, 2016

(54) SYSTEM AND METHOD FOR SYNCHRONOUSLY ADJUSTED DELAY AND DISTORTION MITIGATED RECOVERY OF SIGNALS

(71) Applicant: CADENCE DESIGN SYSTEMS, INC., San Jose, CA (US)

(72) Inventors: Eric Naviasky, Ellicott City, MD (US); Thomas E. Wilson, Laurel, MD (US)

(73) Assignee: Cadence Design Systems, Inc., San Jose, CA (US)

( * ) Notice: Subject to any disclaimer, the term of this patent is extended or adjusted under 35 U.S.C. 154(b) by 238 days.

(21) Appl. No.: 14/268,825

(22) Filed: May 2, 2014

(51) Int. Cl.
*G06F 13/42* (2006.01)
*G06F 1/12* (2006.01)
*G06F 1/10* (2006.01)

(52) U.S. Cl.
CPC .... *G06F 1/12* (2013.01); *G06F 1/10* (2013.01)

(58) Field of Classification Search
CPC ............... G06F 1/10; G06F 1/12; G11C 7/22
USPC .......................................................... 713/401
See application file for complete search history.

(56) References Cited

U.S. PATENT DOCUMENTS

| | | | | |
|---|---|---|---|---|
| 4,170,766 A * | 10/1979 | Pridham | ................. | G01S 3/805 342/374 |
| 4,308,422 A * | 12/1981 | Schmoll, III | ........... | G10H 1/043 381/62 |
| 4,559,621 A * | 12/1985 | Delignieres | ........... | G01S 5/0036 367/106 |
| 4,566,091 A * | 1/1986 | Gerard | ................. | G11B 7/0045 369/47.19 |
| 4,566,092 A * | 1/1986 | Gerard | ................. | G11B 7/0045 360/39 |
| 4,739,277 A * | 4/1988 | Hollister | ................ | G01R 13/32 327/232 |
| 4,984,241 A * | 1/1991 | Truong | ..................... | G06F 1/12 326/11 |
| 5,212,601 A * | 5/1993 | Wilson | ............... | G11B 20/1403 360/44 |
| 5,619,686 A * | 4/1997 | Lin | ........................ | H04L 7/0091 713/401 |
| RE35,797 E * | 5/1998 | Graham | ............... | G05B 19/045 326/40 |
| 6,421,784 B1 * | 7/2002 | Chu | ........................ | G06F 5/06 327/276 |
| 6,680,636 B1 * | 1/2004 | Parry | ........................ | G06F 1/10 327/161 |
| 7,028,208 B2 * | 4/2006 | Johnson | ................... | G06F 1/12 327/158 |
| 8,122,275 B2 * | 2/2012 | Chong | ................ | G11C 7/1066 365/233.1 |
| 9,240,847 B2 * | 1/2016 | Wuchert | ................ | H04B 15/00 |
| 2002/0070783 A1 * | 6/2002 | Saeki | ........................ | G06F 1/06 327/235 |
| 2009/0245447 A1 * | 10/2009 | Schwartz | ................ | G06F 1/022 375/362 |
| 2009/0284297 A1 * | 11/2009 | Ebuchi | .................... | H03L 7/093 327/291 |
| 2014/0050250 A1 * | 2/2014 | Geng | ..................... | H03K 5/159 375/146 |
| 2014/0192938 A1 * | 7/2014 | Tamura | ................... | H03M 9/00 375/355 |
| 2015/0146829 A1 * | 5/2015 | Wuchert | ................ | G01D 3/032 375/355 |
| 2015/0236618 A1 * | 8/2015 | Perdikakis | ................ | H02P 6/14 318/400.27 |

* cited by examiner

Primary Examiner — Thomas Lee
Assistant Examiner — Volvick Derose
(74) *Attorney, Agent, or Firm* — Rosenberg, Klein & Lee

(57) ABSTRACT

A system and method are provided which incrementally samples and delays a signal passed through a transmission channel thereto. A receiver section is provided with a delay stage including a sample storage portion having a plurality of capacitors. A switch portion selectively switches the capacitors to respectively store incremental samples of the signal received through the channel. A clock source is provided to generate a plurality of periodic clock signals progressively shifted by a predefined clock phase increment. The clock source drives the switch portion to synchronously cycle the capacitors through at least sample and readout modes of operation, which are mutually offset in time by a preselected number of clock phase increments. The received signal is collectively reconstructed from the incremental samples of the capacitors, such that the reconstructed signal is delayed by the preselected number of clock phase increments.

20 Claims, 24 Drawing Sheets

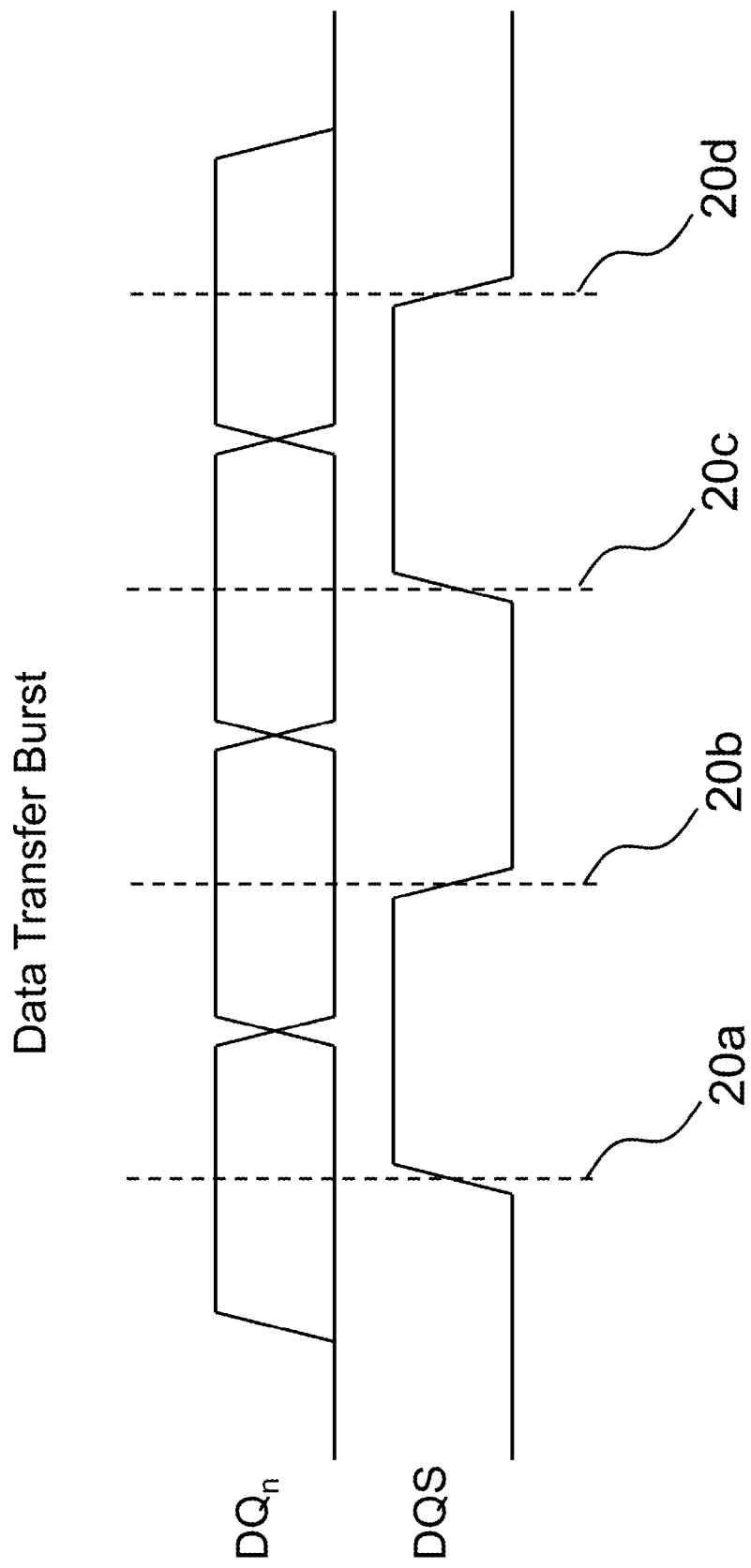

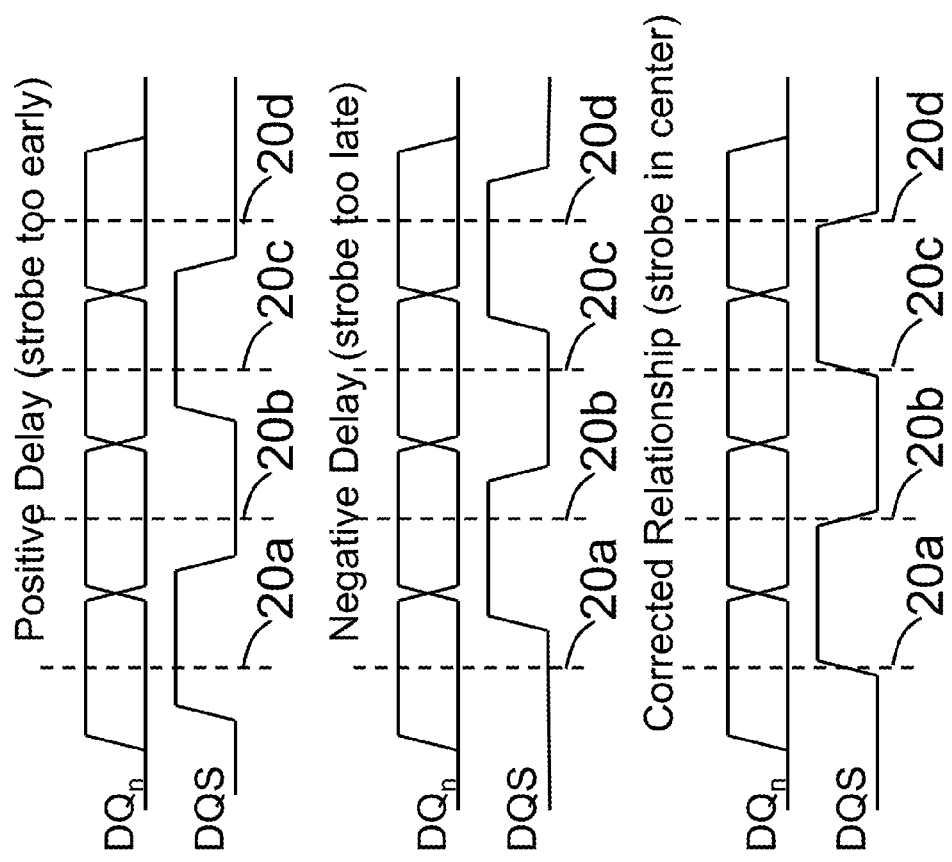

SYSTEM AND METHOD FOR SYNCHRONOUSLY ADJUSTED DELAY AND DISTORTION MITIGATED RECOVERY OF SIGNALS

BACKGROUND OF THE INVENTION

The subject system and method are generally directed to optimizing the precision of delaying and recovering signals for various applications. The system and method provide for the selective generation of highly stable signal delay, and for the recovery of transmitted signals in a manner that mitigates certain distortive content (like those due to frequency response, group delay, or the like). The system and method provide for the fine adjustment of signal delay based on a synchronous source, avoiding such asynchronous effects of jitter, signal distortion, and the like.

Various approaches to delaying signals are known in the art. FIG. 1 generally illustrates an approach widely used in the art in various forms. As shown, the approach essentially provides a line of uniform buffer stages interconnected to implement a programmable buffer delay line with selectable delay taps defined at successive interconnection points between buffer stages. The desired delay may simply be tapped off the buffer delay line after the incoming signal has traversed a selected number of buffer stages, having undergone a unit delay with each buffer stage traversed. A multiplexor or other such switching arrangement is used to select the desired delay tapped from the delay line. The delayed signal is then available for various uses, such as correcting a given timing skew between signals in source synchronous interfaces.

Since the propagation delay through each buffer stage defines the unit of delay, the actual signal delay obtained from such buffer delay lines is subject to random, asynchronous effects, and prone to drift. That is, the obtained delay necessarily suffers instability due to process, voltage, and time (PVT) variations. For example, supply noise variations in the buffer delay line circuitry itself yield momentary variations, or jitter, in the delay. Jitter introduced in a sampling clock signal, such as a DQS strobe signal in source synchronous applications, disturbs its time alignment with the data being sampled ($DQ_n$ data in source synchronous applications), raising the risk of error in sampling the data. Additional factors like the variable capacitor loading on the buffer delay stages often relied upon to speed up or slow down the delays for finer delay resolution only add to the noise sensitivity and overall lack of consistency and predictability in the buffer delay line.

While such instability in buffer delay lines are tolerable in many applications, they are becoming less and less tolerable as electronic systems become increasingly faster in operation and more densely integrated in fabrication. Unless significant remedial measures like adaptive calibration are continually provided, increasing demands for shorter bit lengths and precise synchronization requirements would preclude the use of such buffer delay lines or other similarly unstable, asynchronously deviant forms of delay generation.

Another increasingly prohibitive drawback of buffer delay line approaches for delay generation is the mismatch induced pulse width/duty cycle distortion they introduce in signals as they travel through each delay stage. Each buffer making up a delay stage is typically implemented with MOS transistor devices of different channel type and strength. Random mismatch differences in MOS device strengths invariably alter the rise and fall times of the signal, causing unintended effects. An altered rise time, for instance, affects the point at which the next stage's buffer switches, causing artificial variation in the delay actually contributed by the stage. As illustrated in FIG. 2, the signal's waveform is repeatedly altered as it encounters successive buffer stages, resulting in duty cycle distortion.

Without elaborate measures like the use of different delay lines for rising and falling edges, for example, mismatch induced duty cycle distortion remains a source of random, asynchronous error in delay generation. The problem is only exacerbated by the ongoing trend towards increasingly smaller device geometries.

There is therefore a need for a system and method for selective generation of precise delay for a signal, wherein the generated delay is stable and adjustable in synchronous manner. There is a need for delay generation which minimizes asynchronous sources of deviation in the delay. There is a need for such delay generation for a signal, wherein the distortive content of a signal is mitigated.

SUMMARY OF THE INVENTION

It is an object of the present invention to provide a system and method for selective generation of precise delay for a signal.

It is another object of the present invention to provide a system and method which generates a signal delay that is stable and adjustable in synchronous manner.

It is yet another object of the present invention to provide a system and method for precise generation of signal delay which minimizes asynchronous sources of variation in the delay, and mitigates distortive content of the signal.

These and other objects are attained in a system and method for synchronously adjusted delay and distortion mitigated recovery of signals. The system comprises a receiver section for incrementally sampling and delaying a signal passed through a transmission channel thereto, the signal being defined with respect to a predetermined unit interval (UI). The receiver section is provided with a delay stage including a sample storage portion having a plurality of capacitors. A switch portion is coupled to the sample storage portion. The switch portion selectively switches the capacitors to respectively store incremental samples of the signal received through the channel, with each of the incremental samples representing a segment of the signal spanning a predetermined fraction of one UI in time. A clock source is provided to generate a plurality of periodic clock signals progressively shifted by a predefined clock phase increment. The clock source drives the switch portion to synchronously cycle the capacitors through at least sample and readout modes of operation, the readout and sample modes being mutually offset in time by a preselected number of clock phase increments. Each of the capacitors in the sample mode is charged responsive to the received signal. The received signal is collectively reconstructed from the incremental samples of the capacitors, such that the reconstructed signal is delayed by the preselected number of clock phase increments.

A method realized in accordance with certain embodiments of the present invention for synchronously adjusted delay and distortion mitigated recovery of signals comprises incrementally sampling and delaying a signal passed through a transmission channel thereto. The signal is defined with respect to a predetermined unit interval (UI). The method further comprises sampling and delaying a signal received through the channel. A plurality of capacitors are selectively switched to respectively store incremental samples of the signal received through the channel, each of the incremental samples representing a segment of the signal spanning a predetermined duration less than of one UI in time. A plurality of periodic clock signals are generated to be progressively shifted by a predefined clock phase increment. The capacitors are synchronously cycled through at least sample and readout modes of operation, the readout and sample modes being mutually offset in time by a preselected number of clock phase increments. Each of the capacitors in the sample mode is charged responsive to the received signal. The received signal is collectively reconstructed from the incremental samples of the capacitors, such that the reconstructed signal is delayed by the preselected number of clock phase increments.

In accordance with certain embodiments of the present invention, a source synchronous interface system for synchronously adjusted delay and distortion mitigated recovery of transmitted signals comprises a receiver for sampling and mutually time aligning data and strobe signals transmitted source synchronously thereto through respective transmission channels. Each of the data and strobe signals being defined with respect to a predetermined unit interval (UI). The receiver provides for each transmission channel a receiver section having a delay stage, which includes a sample storage portion having a plurality of capacitors. A switch portion is coupled to the sample storage portion. The switch portion selectively switches the capacitors to respectively store incremental samples of the signal received through the channel, each of the incremental samples representing a segment of the signal spanning a predetermined duration shorter than of one UI in time. A clock source is provided to generate a plurality of periodic clock signals progressively shifted by a predefined clock phase increment. The clock source drives the switch portion to synchronously cycle the capacitors through at least sample and readout modes of operation, the readout and sample modes being mutually offset in time by a preselected number of clock phase increments. The received signal is collectively reconstructed from the incremental samples of the capacitors, such that the reconstructed signal is delayed by the preselected number of clock phase increments for inter-channel time alignment.

BRIEF DESCRIPTION OF THE DRAWINGS

FIG. 4A is a timing diagram illustrating an example of time alignment between source synchronously transmitted strobe and data signals;

FIG. 4B is a set of timing diagrams comparatively illustrating examples of skewed and correct time alignments between source synchronously transmitted strobe and data signals;

DETAILED DESCRIPTION OF THE PREFERRED EMBODIMENTS

Figure 1:
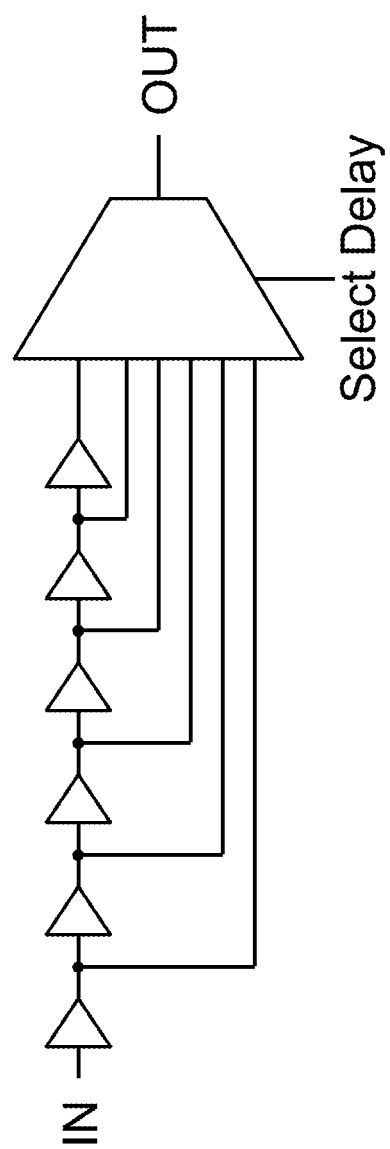
FIG. 1 is a schematic block diagram illustrating a conventional buffer delay line approach to selectively delaying a signal.
Figure 2:
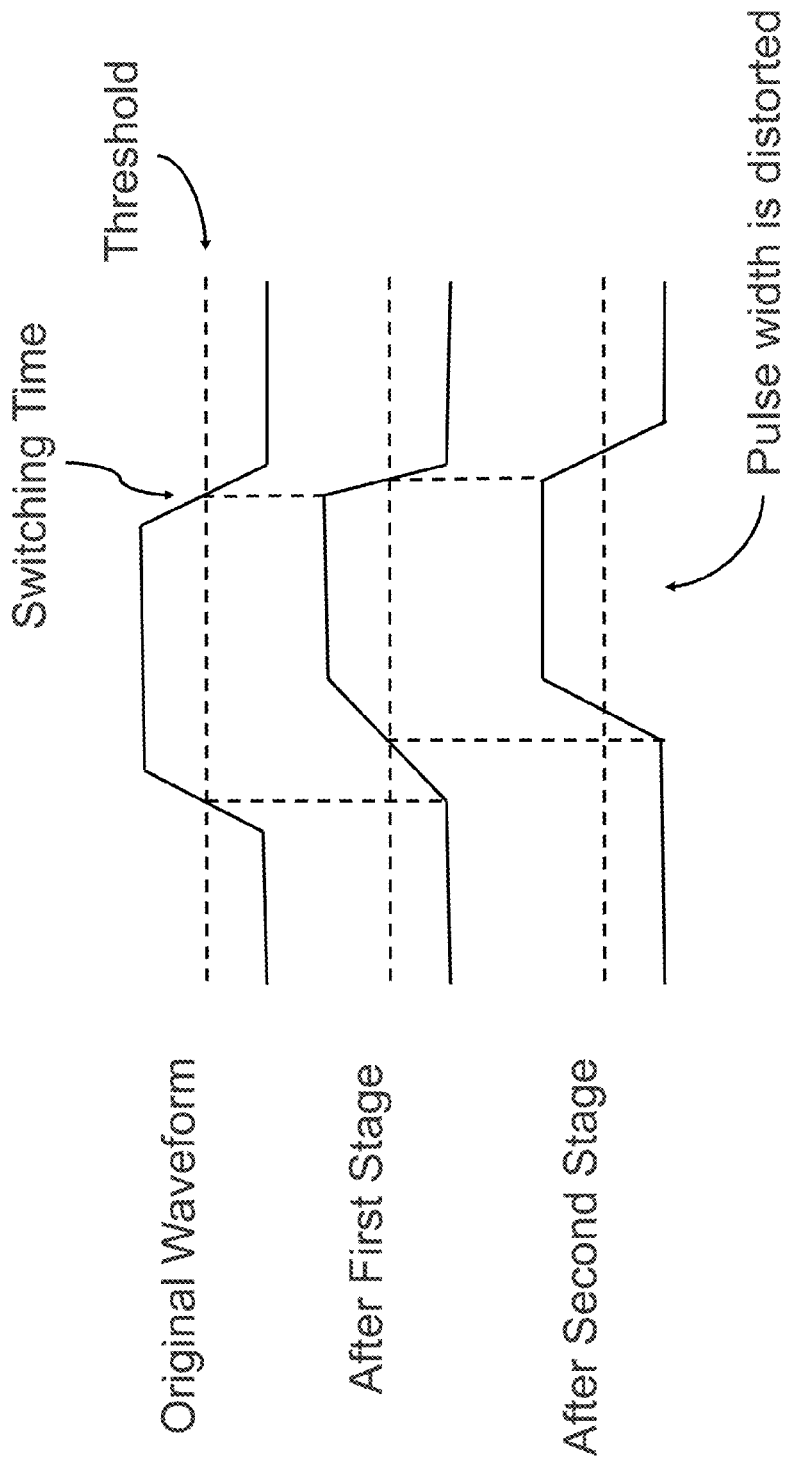
FIG. 2 is a timing diagram comparatively illustrating the distortion of a signal as it traverses successive delay stages in the conventional approach shown in FIG. 1.

The subject system and method are generally directed to optimizing the precision of delaying and recovering signals for various applications. The subject system and method serves among other things to generate stable delay for a signal in highly accurate and reliable manner, free of asynchronous effects induced in conventional delay circuits known in the art. The system applies delay to a signal that is generated and adjusted based consistently on a stable synchronous clock source rather than on architectural features of a circuit prone to asynchronous variation during operation. The system, moreover, delays and recovers a signal transmitted through a channel in a manner that mitigates its distortive content (a channel, as used herein, referring generally to the medium which links a transmitter to a receiver, including portions established in wired or wireless manner).

When applied to receiver applications, the system oversamples and stores incremental portions of an incoming signal in integrating capacitor cells for delayed readout some predetermined clock phase increments later. The sample segments so obtained are used to reconstruct a version of the signal having synchronously adjusted delay and mitigated distortion. The incoming signal is thereby recovered in time-delayed form, with distortions due to such things as noise, interference, channel dispersion, or the like effectively mitigated.

In certain applications, like those using a source synchronous interface, the system preferably employs additional measures on transmit to suitably pre-compensate a signal in time by applying a selectively generated delay thereto. Where the receiving end is without suitable delay measures to remove timing skew, this ensures the properly time aligned arrival of signals there.

A system formed in accordance with an exemplary embodiment of the present invention is described for illustrative purposes in connection with a source synchronous interface application. As will be apparent to those skilled in the art, the present invention is not limited to such application, and the system may be suitably adapted for various other applications where precise, stable timing compensation and recovery of transmitted signals is needed.

It is to be noted that as used herein general references to a 'synchronous' clock source, to certain 'synchronous' behavior/operation, simply denotes the stable and consistent periodic nature of the given source, behavior, or other thing in question. This should not be confused with specific references to "source synchronous" interfaces, or to "source synchronously" transmitted signals which relate to a particular type of communication interface known in the art by that designation. Unless specifically noted otherwise, general references to 'synchronous' herein do not necessarily mean that a particularly referenced source, behavior, or the like is periodically related (in frequency, phase, or otherwise) to the "source synchronous" interface or signal mentioned.

Among other things, the system in certain exemplary embodiments generally provides effective measures for:
1. generation of a stable delay for a signal;
2. restorative post filtering of a signal sampled and delayed on receive; and,
3. impulse response equalization of the sampled signal on receive.

Each of these measures may be separately employed apart from the others to address certain drawbacks. Preferably, they are employed in suitable combination, depending on the particular requirements of the intended application, for optimal precision in delayed recovery of a signal.

A system formed in accordance with an exemplary embodiment of the present invention may be used in connection with certain source synchronous interface applications for generating stable signal delay, for use in the precise leveling of signals to compensate for timing skew. In source synchronous interface applications, a data signal is necessarily transmitted with a corresponding strobe signal. The signals are transmitted through respective transmission channels. But various mismatches in the channels typically cause the strobe and data signals to arrive at mismatched times. In other words, the strobe and data signals arrive at the destination skewed in time. This will disrupt the reading and writing of data, unless leveling is carried out to either preserve or restore proper relative time alignment of mutually associated strobe and data signals.

Figure 3:
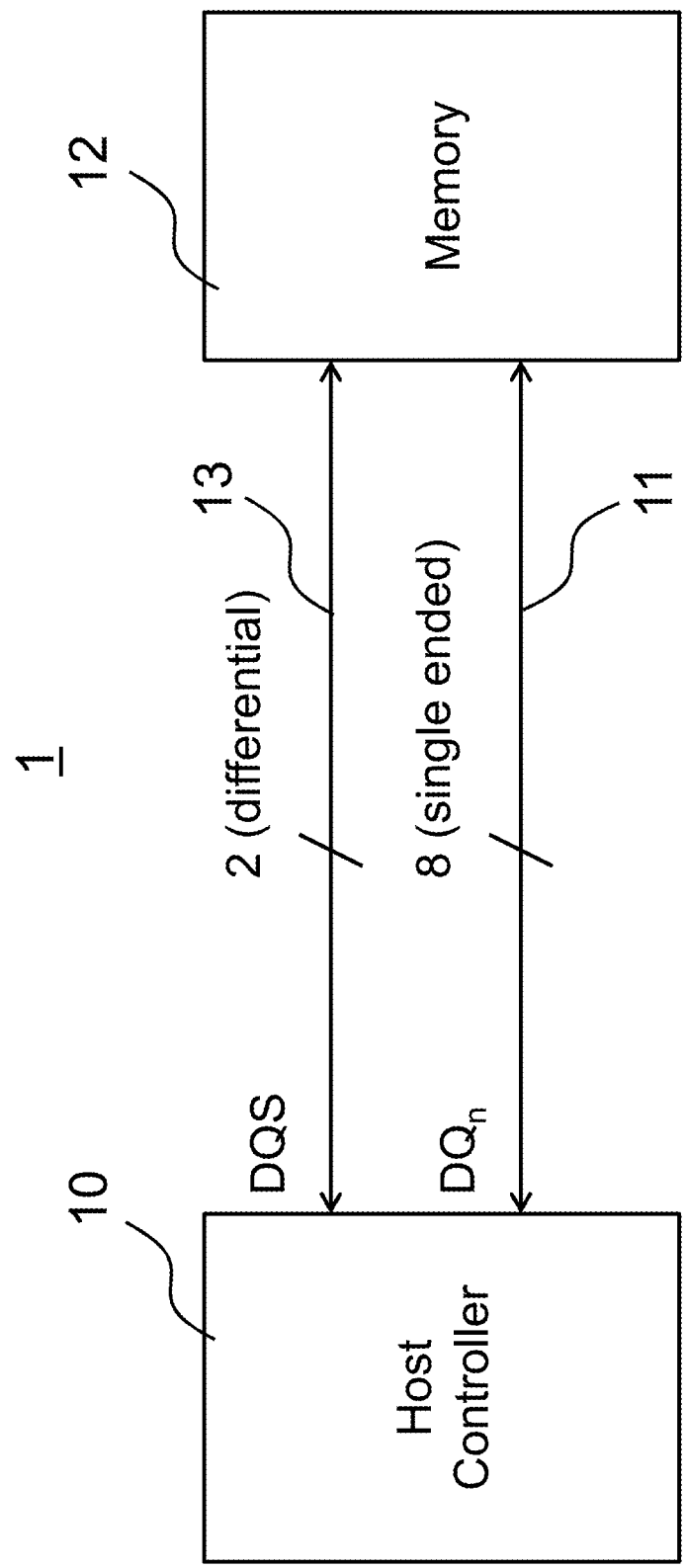
FIG. 3 is the schematic block diagram generally illustrating certain modules of a DDR memory system.

FIG. 3 schematically illustrates one example of a widely used source synchronous interface application, namely memory systems of the so-called dual data rate (DDR) type. A memory system 1 employing DDR architecture includes a host controller 10 coupled through a bidirectional source synchronous interface to a memory module having a plurality of memory devices 12 (although only one memory device is shown to preserve brevity and clarity of illustration). The host controller 10 maintains read and write control over the module's memory devices 12. For each memory device 12, multi-bit data ($DQ_n$) and strobe (DQS) signals are passed bidirectionally between the host controller 10 and that memory device 12 during various read and write operations. Because control processing is carried out exclusively by the host controller 10 for both read and write operations, the host controller 10 includes a transceiver that controls the transmission interface for source synchronously writing data to the memory device 12, as well as the receive interface for source synchronously reading data from the memory device 12.

In the particular example shown, four or eight single ended data bit signals DQ are typically passed through respective channels 11 suitably established between the host controller 10 and memory device 12. A differential strobe signal DQS is passed therebetween through a corresponding channel 13. The particular configuration of the memory system 1, such as the exemplary number and format of the data and strobe signals, are shown for illustrative purposes only. The actual configuration employed will depend on the particular requirements of the intended application.

The timing signal in source synchronous communications serves as an indicator of valid content in the accompanying data signals. In the given DDR memory example, a transition in the timing signal, namely the DQS strobe signal, indicates the concurrent availability of valid $DQ_n$ data. Ideally, the received DQS strobe and $DQ_n$ data signals would be sufficiently well aligned in time that a DQS strobe transition occurs at or near the center of corresponding $DQ_n$ data bits. This is illustrated in FIG. 4A, where the DQS strobe and $DQ_n$ data signals are time aligned, such that the DQS strobe transitions 20a, 20b, 20c, 20d all remain coincident with respective ones of the accompanying $DQ_n$ data bit pulses. Thus, proper read out of the proper $DQ_n$ data bit values may occur, as triggered by the DQS strobe transitions.

When actually implemented, however, strobe and data signals are passed chip to chip, device to device, or module to module through non-ideal transmissions channels that typically include various printed circuit board traces, connectors, device packaging, or the like. Neither these channels nor the drivers and receivers between which they extend can be matched precisely enough to preserve sufficient time alignment of the strobe and data signals in actual applications. Consequently, some degree of timing skew normally occurs, with the strobe and corresponding data signals arriving at a receiver skewed in their relative timing.

FIG. 4B illustrates different scenarios where timing skew is present, as compared to the ideal case of FIG. 4A where no timing skew is present. In the first scenario the DQS strobe signal arrives too early relative to its $DQ_n$ data signals for all the strobe transitions to align sufficiently with data bit pulses, while in the second scenario the DQS strobe signal arrives too late for all the strobe transitions to align sufficiently with data bit pulses. In either case, the DQS strobe transitions come too close to the transitions of certain $DQ_n$ data bit pulses to enable the sampling of their correct values.

While the timing skews illustrated for explanatory purposes in FIG. 4B extend +/−½ UI, the full range of timing skew requiring correction may actually extend beyond this to span a full UI in either direction. Also, the correct relative alignment between the DQS strobe and $DQ_n$ data in certain applications may be different from that illustrated for explanatory purposes in FIGS. 4A-4B. For example, the DQS strobe is actually edge launched with its corresponding $DQ_n$ data bits in certain applications to reduce accumulation of errors. Moreover, the DQS strobe and $DQ_n$ data bit pulses shown in FIGS. 4A-4B normally occur within signals transmitted in burst mode, where neither the DQS strobe nor $DQ_n$ data bit signals is continuous.

The timing skew in either direction (early or late relative arrival) must be removed before the received DQS strobe may be reliably used for sampling the $DQ_n$ data line values. As mentioned in preceding paragraphs a host controller must correct for such timing skew during both the read and write operations in the DDR memory example of a source synchronous interface, since memory modules themselves are without any ability to correct for timing skew. Hence, the host controller's transmitter must be able to pre-adjust the relative time alignment between strobe and data signals at launch so that they assume ideal alignment when received at its memory module (write leveling). Additionally, the host controller's receiver must be able to correct the relative time alignment between incoming strobe and data signals (read leveling).

Leveling (on Receive)

In lieu of the conventional solution of FIG. 1 widely used in the art to generate the signal delays necessary to correct this $DQS/DQ_n$ timing skew, a system formed in accordance with one exemplary embodiment of the present invention employs an altogether different architectural paradigm to generate a compensatory signal delay. Depending on the particularly intended application, the compensatory delay required for source synchronously transmitted signals may be applied on receive and/or on transmit (to either remove or prevent timing skew in the received signal). In the given example of a DDR memory system, compensation is preferably applied in both the receiver and transmitter contexts, as the host controller 10 (FIG. 3) controls both read and write leveling.

Timing compensation in the receiver context tends to be more involved in that the incoming strobe and data signals must be sampled by the receiver. The bit values of the incoming signals are not known beforehand, and must be determined by sampling. Stable compensatory signal delays must be generated for a signal in the presence of crosstalk effects from neighboring parallel data bits, and without introducing excessive additional distortion or jitter to the given signal in the process.

Figure 5:
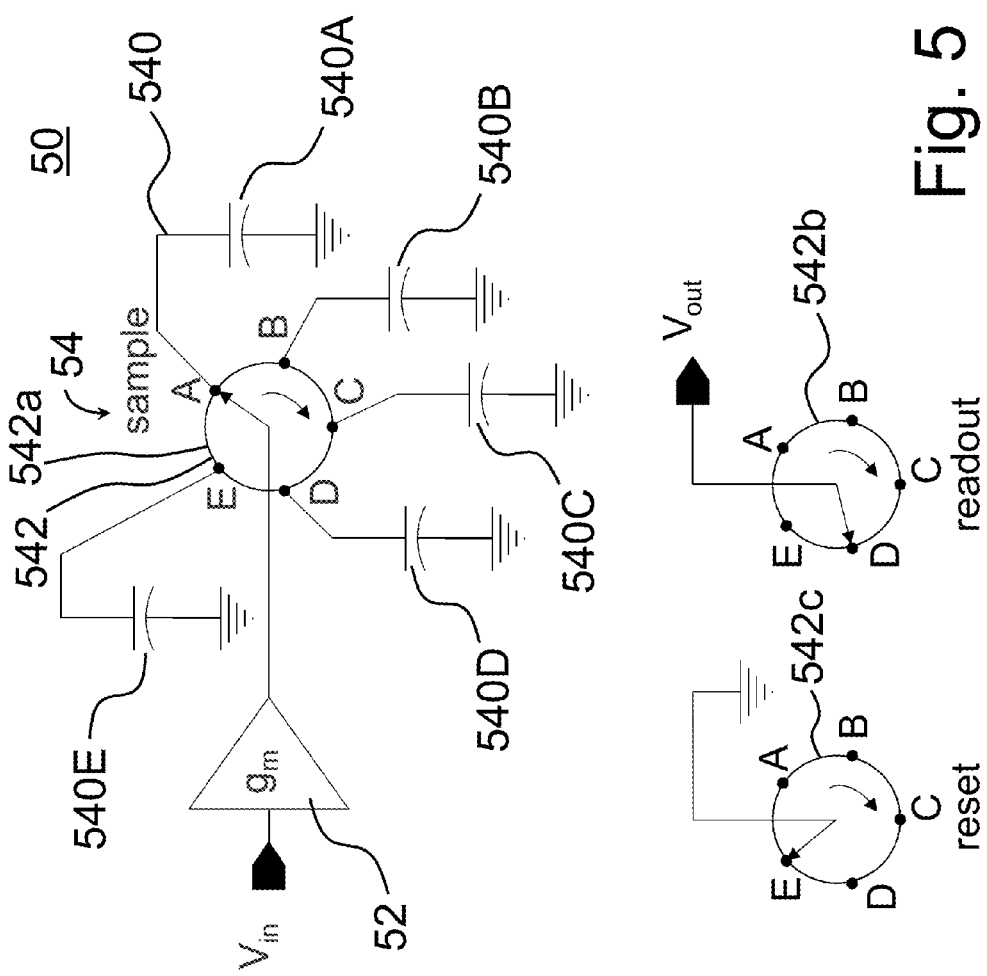
FIG. 5 is a schematic block diagram conceptually illustrating a receiver section formed in accordance with an exemplary embodiment of the present invention.

Turning now to FIG. 5, the operational configuration of a receiver section formed in accordance with one exemplary embodiment of the present invention is schematically illustrated. For clarity and brevity, one receiver section 50 serving a particular signal transmission channel is illustrated. Similar receiver sections 50 are preferably employed for each of the other signal channels employed in the illustrated embodiment, whether for receiving strobe or data signals. The different portions of receiver section 50 are shown conceptually represented and arranged in FIG. 5 to illustrate their effective operational functions, but may be implemented in practice using any suitable component and device measures known in the art. This includes such components as the commutating switch portion and the individual commutating switches conceptually represented therefor, which are described in following paragraphs.

As shown, the receiver section 50 serves to sample and delay an incoming signal $V_{in}$ received through the given channel. Each receiver section 50 preferably includes a transconductance input stage 52 which converts the incoming signal $V_{in}$ to a current signal suitable for capacitive charging use. The transconductance input stage couples to a delay stage 54 formed generally by a sample storage portion 540 that is selectively switched by a commutating switch portion 542 coupled thereto.

The sample storage portion 540 includes a bank of integrating capacitors tied to respective switching taps A, B, C, D, E. As described in following paragraphs, the commutating switch portion 542 is driven by a suitable clock source through a synchronous cycle divided into a plurality of switch states incrementally spaced in time by a predetermined clock phase increment. Each of the switching taps A-E represents a switch state within the cycle. While only five switching taps A-E (and states) are shown for simplicity of illustration, the actual number of switching taps and states is typically greater than just the five shown, and may be of any number suitable for the intended application.

Because the actual mismatch between DQS strobe and its corresponding $DQ_n$ data bits is not known beforehand at the receiver, an ample number of sample segments must be collected to cover the worst case potential mismatch in both directions (early or late relative arrival). That is, the sample segments must span enough potential delay time to cover both the case where the DQS strobe transitions arrive first and the $DQ_n$ data bits arrive as late thereafter as possible, and the case where the $DQ_n$ data bits arrive first and the DQS strobe transitions arrive as late thereafter as possible. The commutating switch cycle is thus preferably configured with a sufficient number of switching states to span twice the worst case mismatch in time.

Transmitted digital signals are normally defined with respect to a predetermined unit interval (UI) time reference, which represents the length of one data bit. The predetermined clock phase increment is preferably set to a fractional value of one UI, so that the incoming signal is oversampled in 'sub-UI' increments which are combined to collectively reconstruct one bit of the sampled signal. Preferably, enough switching taps (like the five switching taps A-E shown) are defined in each receiver section 50 that the commutating cycle's period spans multiple UI's to accommodate inter-bit processing such as 'look-back' or 'look-ahead' scaling for equalization purposes.

The commutating switch portion 542 preferably includes at least first, second, and third commutating switches 542a, 542b, 542c which cycle synchronously, but in mutually phase offset manner. The first commutating switch 542a effectively cycles incrementally through the switching taps A-E, preferably dwelling at each tap for the predetermined clock phase increment. During this time that the first commutating switch 542a remains coupled to each switching tap A-E to configure the particular integrating capacitor 540A-540E connected to that tap in a 'Sample' mode of operation. The current signal from the transconductance input stage 52 then passes to and charges the switching tap's integrating capacitor 540A-540E. After the clock phase increment elapses, the first commutating switch 542a effectively advances to the next switching tap and likewise dwells there over the next clock phase increment while the current signal from the transconductance input stage 52 passes to and charges that switching tap's integrating capacitor 540A-540E. This effective process continues as the first commutating switch 542a steps successively through each switching tap during one cycle (commutation period).

The charging which occurs over a clock phase increment during the Sample mode of each integrating capacitor 540A-540E provides an integrating function. Unlike a discrete impulse sample, the integration afforded by this capacitive charging provides notable advantages. For example, the integration effectively serves a filtering function (in the frequency domain), by averaging out high frequency noise components. This helps to remove the effects of crosstalk, a form of electronic interference which DDR memory systems are particularly vulnerable to, with numerous bits switching at the same time on closely situated lines of a compact printed circuit board (PCB).

Concurrent with the first commutating switch 542a, the second commutating switch 542b effectively cycles synchronously through each of the given switching taps A-E, but lags behind the first commutating switch 542a by one or more phase increments. The particular number of phase increments by which it lags behind is preferably preselected based upon the particular configuration and characteristic properties of the given signal transmission channel, among other things. Typically, a 'training' of the system is carried out beforehand using any suitable measures known in the art for appropriate channel characterization in this regard.

Like the first commutating switch 542a, the second commutating switch 542b effectively cycles incrementally through the given switching taps A-E, preferably dwelling at each tap for one or more clock phase increments. During the time that the second commutating switch 542b remains coupled to each of the switching taps A-E, that tap's integrating capacitor 540A-540E is connected to an output node, and thereby configured in a 'Readout' mode. The voltage at that integrating capacitor 540A-540E, which had been charged during the preceding Sample mode, is then made available at the output node as an output sample signal $V_{in}$. After the clock phase increment elapses, the second commutating switch 542b effectively advances to the next switching tap and likewise dwells there over the next clock phase increment while that switching tap's integrating capacitor 540A-540E is placed in the 'Readout' mode by connection to a corresponding output node. This effective process continues for the second commutating switch 542b as it steps successively through all the switching taps during one commutation period.

The number of phase increments by which the Readout mode is set to lag behind the Sample mode for each integrating capacitor 540A-540E sets the delay incorporated into the incoming signal. Since the delay is selectively determined in this way by a synchronous clock source—in terms of its clock phase increment—the resulting delay is largely free of unpredictable asynchronous effects like jitter and duty cycle distortion which hinder the generation of delay using conventional delay generation means like that of FIG. 1.

A third commutating switch 542c similarly cycles synchronously through each of the given switching taps A-E concurrent with the other commutating switches, lagging behind the second commutating switch 542b by at least one phase increments. This third commutating switch 542c effectively cycles incrementally through the given switching taps A-E, preferably dwelling at each tap for the predetermined clock phase increment. During the time that the third commutating switch 542b remains coupled to each of the switching taps A-E, the tap's integrating capacitor 540A-540E is connected to ground, and thereby configured in a 'Reset' mode. The integrating capacitor 540A-540E, which had been read out during the preceding Readout mode, is then discharged so that it may be available for charging when placed again in the Sample mode during the next commutation cycle.

After the clock phase increment elapses, the third commutating switch 542c effectively advances to the next switching tap to follow a preceding Readout of that tap's integrating capacitor 540A-540E with a Reset. This effective process continues for the third commutating switch 542c as it steps successively through the switching taps during one commutation period.

In actual implementation, a set of first, second, and third commutating switches 542a, 542b, 542c may be separately provided for each integrating capacitor 540A-540E. That allows for commutating switches to dwell at certain operational modes of one integrating capacitor 540A-540E for more than one clock phase increment, without disturbing that commutating switch's synchronization for other integrating capacitors. For example, providing a separate second commutating switch 542b for each of the integrating capacitors 540A-540E allows the second commutating switch 542b for integrating capacitor 540A to dwell at switching tap A for multiple clock phase increments to extend that capacitor's Readout mode in time, without fear of holding back the start of the Readout mode for the next integrating capacitor 540B. The separate second commutating switch 542b for that integrating capacitor 540B may freely switch to switch tap B without regard to the second commutating switch position for integrating capacitor 540A.

Figure 6:
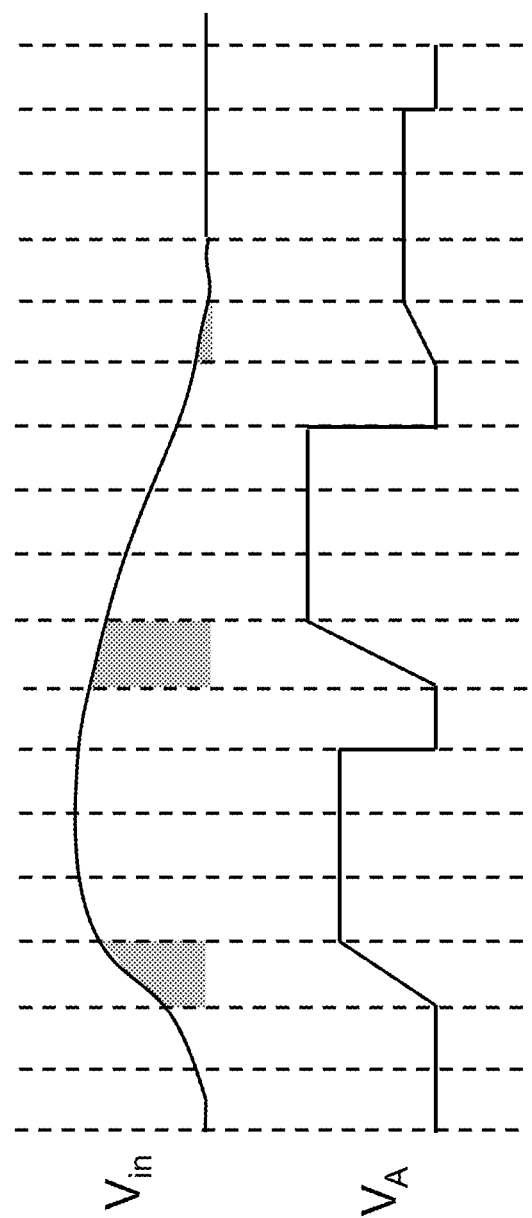
FIG. 6 is a timing diagram comparatively illustrating an example of a received signal and a delayed reconstructed version of a received signal generated using the embodiment of FIG. 5.

The first, second, and third commutating switches 542a, 542b, 542c cooperatively operate in this manner to effectively cycle each of the integrating capacitors 540A-540E through Sample, Readout, and Reset modes of operation within each commutation period. The combined effect of this is illustrated in the waveforms comparatively shown in FIG. 6 for the simplified case where a commutation cycle is divided into just the five segments delineated by the five switching taps A-E illustrated in FIG. 5. In this particular example, the signal current is integrated onto the integrating capacitor 540A every fifth time slice (clock phase increment). As indicated by the waveform of voltage VA at the first integrating capacitor 540A, voltage preferably remains available on that integrating capacitor 540A for three subsequent time slices before the capacitor is Reset on the fourth time slice in preparation for integration again during the next commutation cycle. That is, the second Readout commutating switch 542b for each integrating capacitor 540A-540E remains connected during the intervening time slices between Sample and Reset, during which the integrated charge is held in each integrating capacitor.

While not shown in FIG. 5, a high speed clock source is used to drive the commutating switch portion 542. The clock source preferably employs and injection locked loop (ILL) system with phase interpolation (such as shown and described in connection with FIGS. 16-18), but may include other suitable sources known in the art for providing phase offset clock signals. The high speed clock signals need not have any particular relationship to the waveform being sampled, as long as the sampling is carried out at a rate well above the prevailing Nyquist rate.

By use of the receiver section 50, the delay imposed on a given signal is essentially reduced to a direct function of a clock source. So as long as the clock comes from a high quality crystal oscillator, phase locked loop (PLL), or other such highly stable source, there's substantially no jitter on it. Nor is there any measurable drift. Temperamental power supplies variations and the like which interject instability and rob precision do not factor into generation of delay for the signal. Since charge may be held in capacitors—like the integrating capacitors 540A-540E for considerable lengths of time, until the charge slowly leaks off, the sampled signal segments are substantially immune from such asynchronous variations in the system.

In accordance with certain aspects of the present invention, the combined effect of this synchronously incremented control of delay and the integrated sampling of each signal segment on the integrating capacitors 540A-540E is to provide a signal that is not only delayed with stable precision but whose distortion is mitigated. As noted, the integration of charge in each integrating capacitor removes high frequency noise and reduces the effects of crosstalk present in the sampled signal. Quantization noise and other distortive content of the sampled signal due to channel effects like ISI remaining in the incrementally collected sample segments are further mitigated by post-filtering and impulse response equalization measures described in following paragraphs.

Figure 7A:
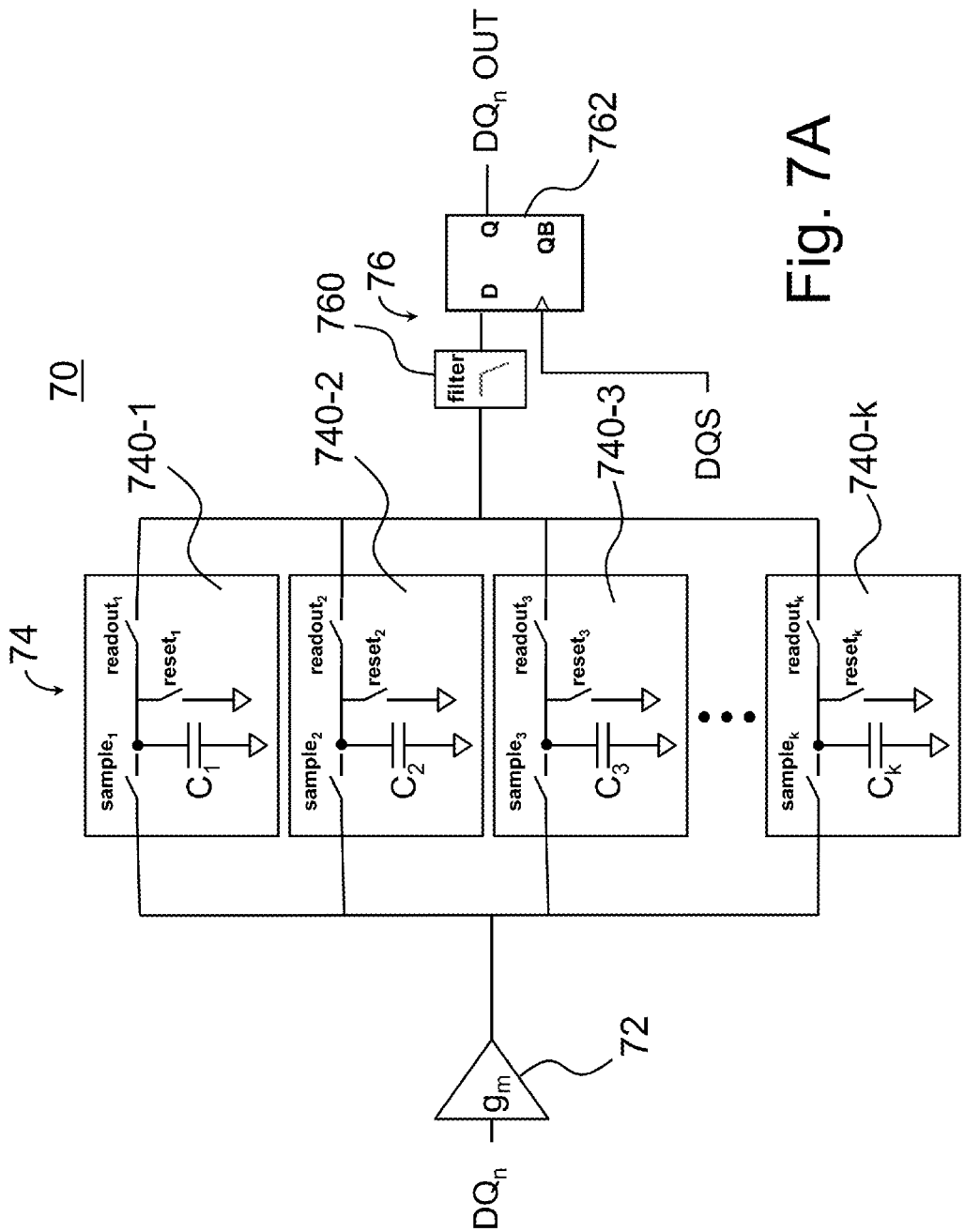
FIG. 7A is a schematic block diagram illustrating a receiver section formed in accordance with an exemplary embodiment of the present invention.

Referring now to FIG. 7A, there is shown a block diagram of a capacitor first-in-first-out (CapFIFO) receiver section 70 illustrating in greater structural detail one preferred implementation of the exemplary receiver section embodiment 50 conceptually shown in FIG. 5. As with FIG. 5, only one CapFIFO receiver section is shown for clarity and brevity. The illustrated CapFIFO receiver section 70 serves in this case a $DQ_n$ data signal transmission channel. Preferably, a similar CapFIFO receiver section 70 is separately employed to sample and delay (and filter, as described in following paragraphs) the corresponding DQS strobe signal transmission channel, as well as for other data and strobe signal channels employed in the given application.

The CapFIFO receiver section 70 includes a transconductance (gm) input stage 72 which converts the incoming data signal $DQ_n$ to a current signal for a delay stage 74 that includes an array of addressable cells 740-1-740-k, each providing a sample segment storage location in the form of integrating capacitors $C_1$-$C_k$. The CapFIFO receiver section 70 preferably also includes an output stage 76 not shown in FIG. 5, which provides a restorative post-filtering portion 760. The post-filtering portion 760 may be formed by any suitable means known in the art to lowpass filter the overall sample formed by reassembling the sample segments coming out of the delay stage 74, for recovery of the received $DQ_n$ data signal's waveform features.

The CapFIFO receiver section 70 preferably also includes in the output stage 76 a gated latch portion 762 by which the delayed and filtered sample obtained for the incoming $DQ_n$ data signal is clocked for appropriate output by the corresponding DQS strobe signal. As noted in preceding paragraphs, the DQS strobe signal is itself incrementally sampled, delayed, and filtered by its own CapFIFO receiver section 70 prior to its passage to the gated latch portion 762 as shown, to clock the output in properly time aligned manner.

Figure 16:
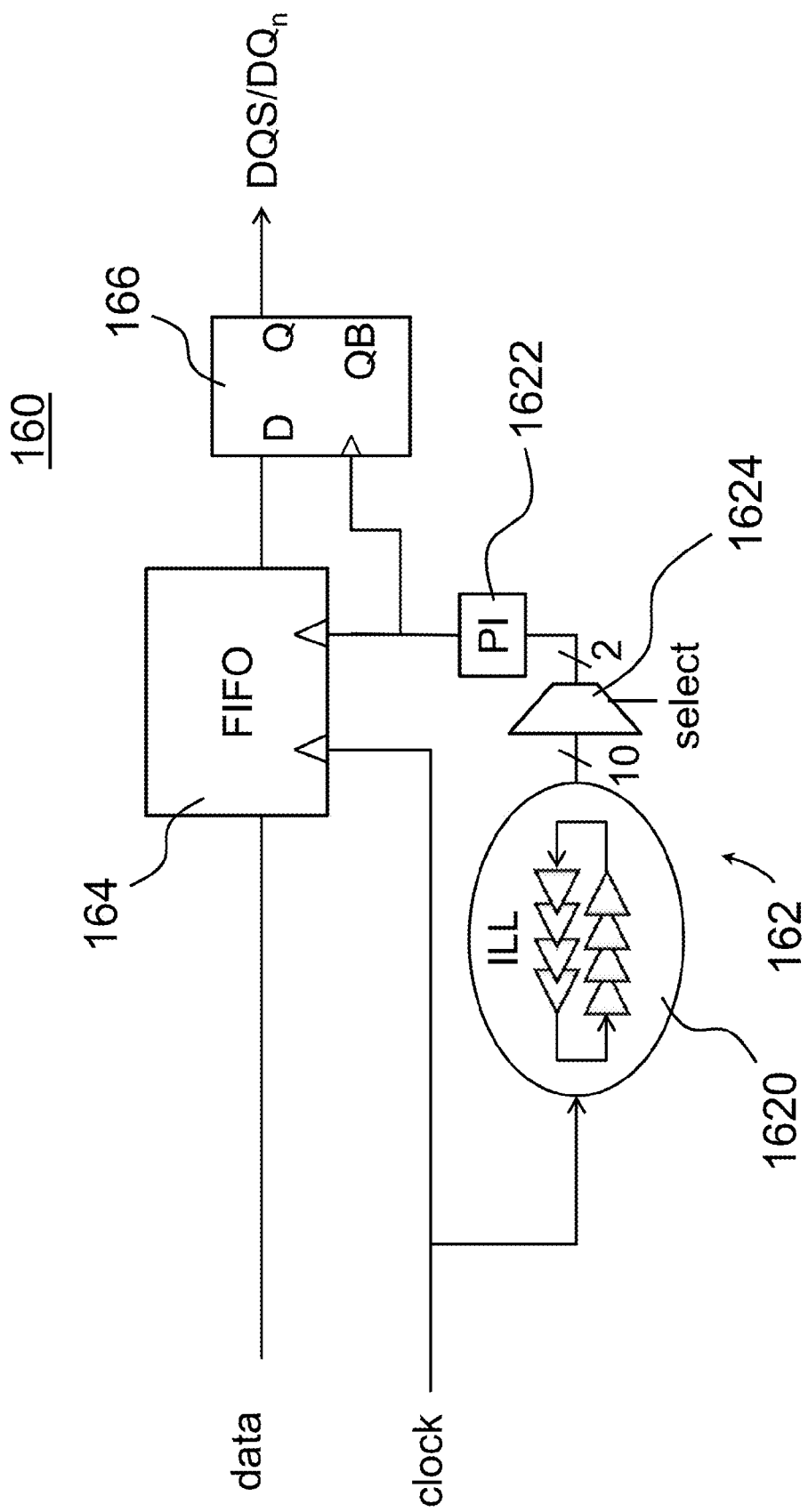
FIG. 16 is a schematic block diagram illustrating a transmitter section formed in accordance with an exemplary embodiment of the present invention.
Figure 17:
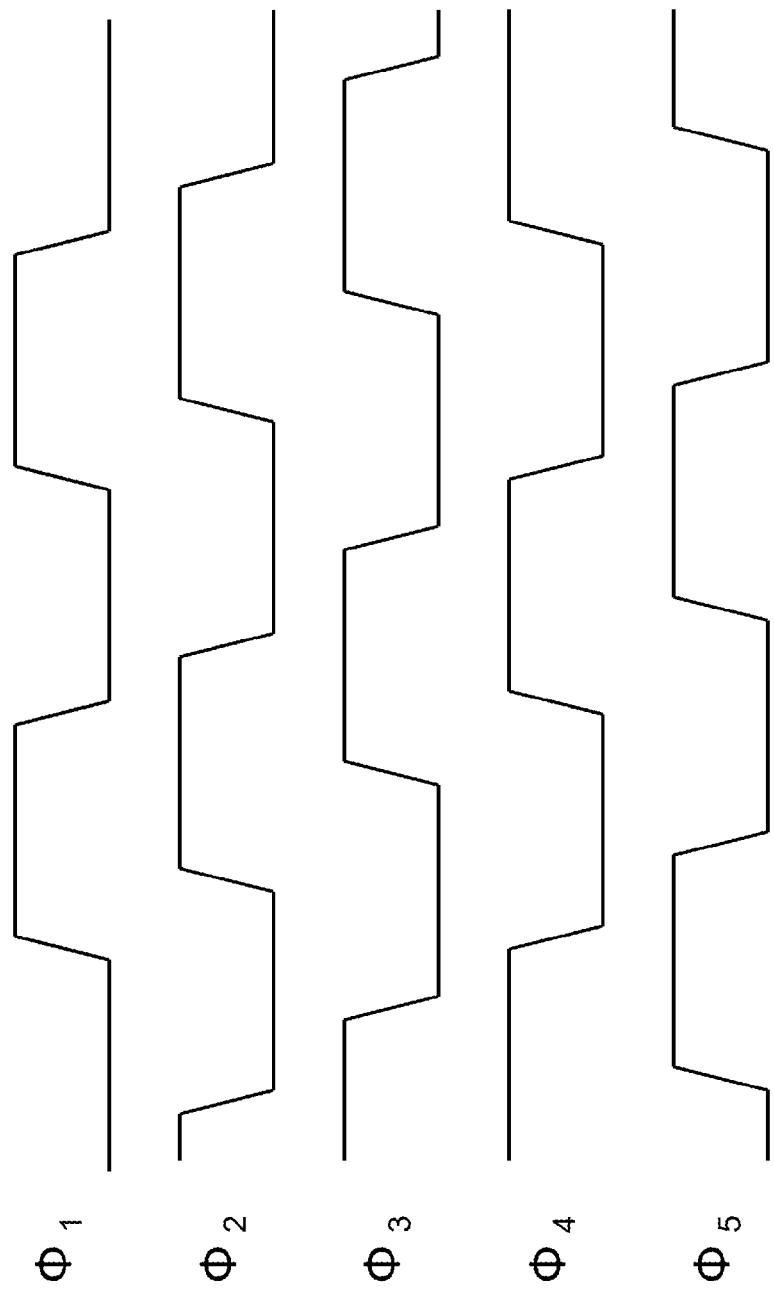
FIG. 17 is a timing diagram comparatively illustrating examples of mutually phase offset versions of a clock signal; and, FIG. 18 is a schematic block diagram of an exemplary phase interpolator portion employed in a clock source employed in an exemplary embodiment of the present invention.
Figure 18:
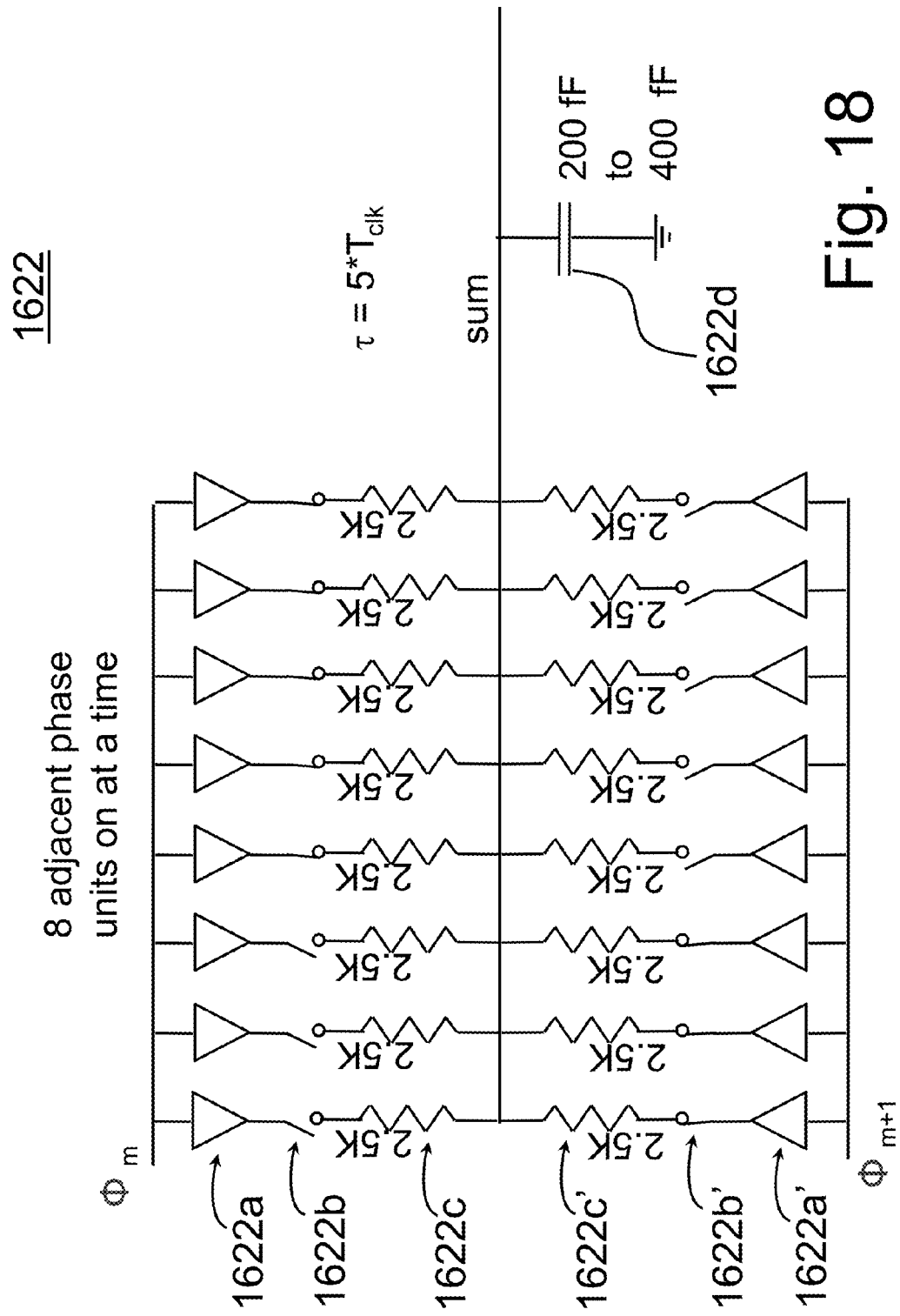

As shown, the delay stage 74 includes an array of FIFO cells 740-1 through 740-k. Each FIFO cell 740-1-740-k preferably includes a set of switches by which its integrating capacitor $C_1$-$C_k$ may be selectively addressed for alternative connection in Sample, Readout, and Reset modes. Preferably, each integrating capacitor $C_1$-$C_k$ is selectively coupled: by a separate $sample_1$-$sample_k$ switch to the gm input stage 72; by a separate $readout_1$-$readout_k$ switch to the output stage 76; and, by a separate $reset_1$-$reset_k$ switch to ground. Each of these switches is driven by a selectively phase shifted version of a clock signal generated by ILL-based phase interpolation (such as shown in FIGS. 16-18), or other suitable source of periodic phase offset clock signals known in the art.

The set of switches coupled to each integrating capacitor $C_1$-$C_k$ in the CapFIFO cells 740-1 through 740-k combine to serve for that integrating capacitor much the same switching functions as described for the commutating switch portion 540 of the receiver section 50 in FIG. 5. By stepping through actuation of the $sample_1$-$sample_k$ switches at clock phase increments, time sliced segments of the incoming $DQ_n$ data signal may be integrated by charging into the integrating capacitors $C_1$-$C_k$ in order, which then hold the integrated voltage until discharged by actuation of their respective $reset_1$-$reset_k$ switches. The voltage held by the integrating capacitors $C_1$-$C_k$ may be read out during the intervening time—selectively at any number of time slices after sampling (integration on the integrating capacitors)—by respective actuation of the $readout_1$-$readout_k$ switches. The number of time slices (or clock phase increments) selected for delaying readout after sampling has occurred then provides the measure of delay imposed on the incoming signal. This is a clean, clock signal-based measure of signal delay.

Figure 7B:
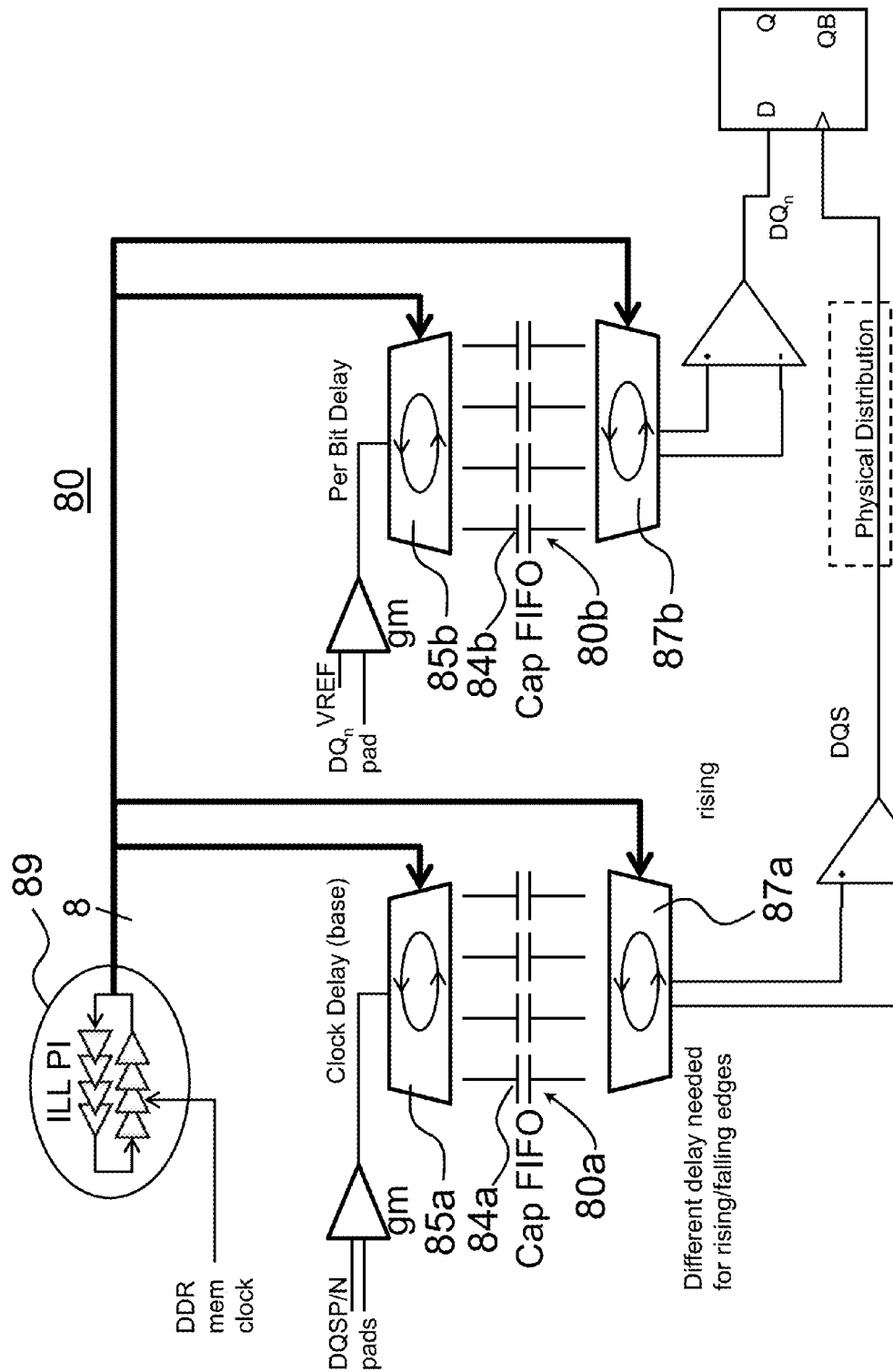
FIG. 7B is a schematic block diagram illustrating a receiver accordance with another exemplary embodiment of the present invention, showing multiple receiver sections for serving different signal transmission channels.

FIG. 7B illustrates a receiver 80 formed in accordance with another exemplary embodiment of the present invention, which shows a plurality of receiver sections 80a, 80b respectively serving the DQS strobe and $DQ_n$ data signal channels. Each of the receiver sections 80a, 80b is of a configuration similar to the CapFIFO receiver section 70 of FIG. 7A. In this FIG. 7B, certain portions of each receiver section 80a, 80b are shown in greater implementation detail. Preferably, each of the receiver section 80a, 80b suitably employs first and second multiplexors 85a and 87a, 85b and 87b to selectively control the commutative switching through Sample, Readout, and Reset modes for each of the cells in its CapFIFO delay stage 84a, 84b as described in preceding paragraphs. Each of the first and second multiplexors 85a and 87a, 85b and 87b is switched according to a clock source stage 89 preferably employing an ILL phase interpolator portion shown and described in connection with FIGS. 16-18. For simplicity of illustration, the receiver 80 is shown without the post-filtering and equalization stages described in following paragraphs.

A notable feature of a CapFIFO receiver section formed in accordance with various embodiments of the present invention (including those embodiments illustrated in FIGS. 5, 7A, and 7B) is it operates equally well on signals received in analog form as it does on signals received in digital form. Unlike the conventional buffer delay line approaches shown in FIG. 1 (typically implemented as inverter delay line circuits) whose delay functions are premised on the signal to be delayed being a digital signal, the subject CapFIFO receiver serves to provide stable, distortion mitigating delay on the received signal, regardless of the signal's analog or digital form.

A system formed in accordance with various embodiments of the present invention may operate on/with signals which are single ended or differential. This will depend on the particular requirements of an intended application, and the present invention is not limited in application to signals of any such type, or to any particular combination of such signal types.

Post-Filtering

Figure 8:
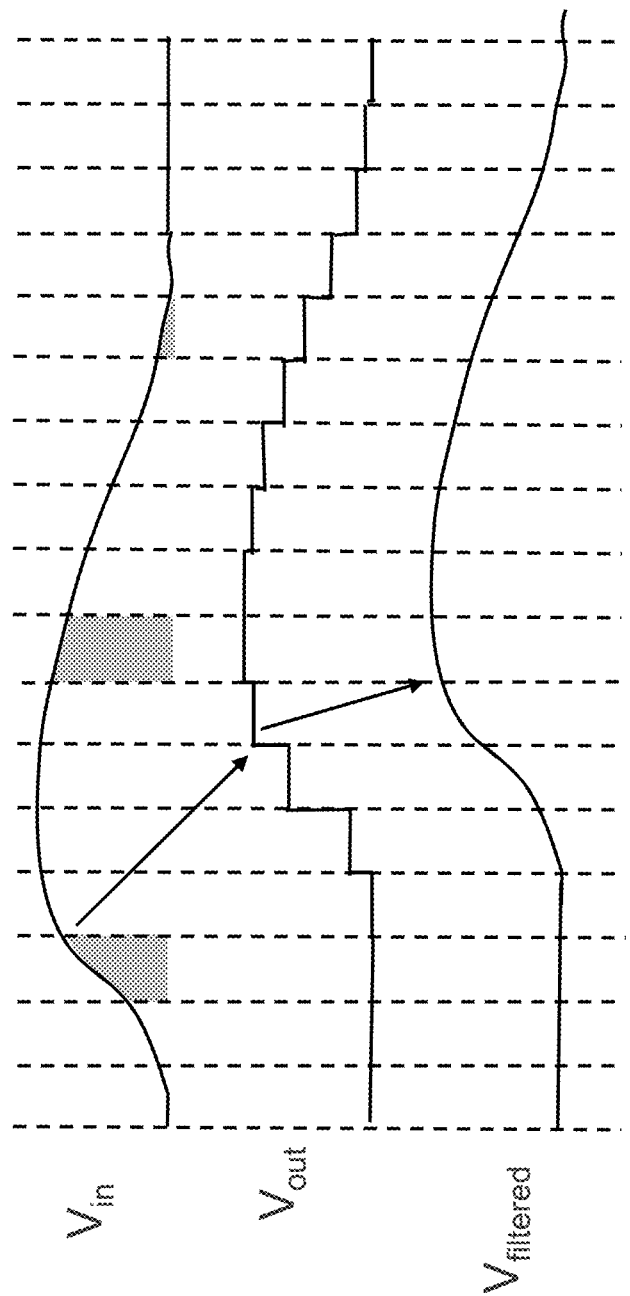
FIG. 8 is a timing diagram comparatively illustrating an example of a received signal and a delayed reconstructed version of a received signal generated using the embodiment of FIG. 7A, before and after post-filtering.

The incrementally time sliced sample segments read out in this manner are then reassembled in sequence to form a discrete time 'pixelated' version of the received $DQ_n$ data signal waveform. FIG. 8 comparatively illustrates this reassembled waveform $V_{out}$ with respect to the incoming signal as received $V_{in}$. The reassembled waveform $V_{out}$ is then lowpass filtered by a post-filtering portion 760 to remove the high frequency noise content remaining in the reassembled waveform $V_{out}$. Much of the incoming signal's original waveform features are recovered, as reflected in the delayed and filtered sample waveform $V_{filtered}$ which results.

The squared off features of the reassembled waveform $V_{out}$ reflect quantization noise which obscures the waveform features of the underlying signal. Quantization noise infuses not only amplitude noise effects, but also time quantization effects which obscure the timing of level crossing signal transitions. Because the underlying signal is preferably sampled in the delay stage at a rate well above the Nyquist rate therefor, its waveform features (including its transitional timing information) are largely preserved, albeit cluttered with quantization noise components. Applying a lowpass filter suitably tuned/configured for the particularities of the application at hand removes the unwanted components and restores the otherwise obscured waveform features of the underlying signal, as illustrated by the $V_{filtered}$ waveform.

Figure 9A:
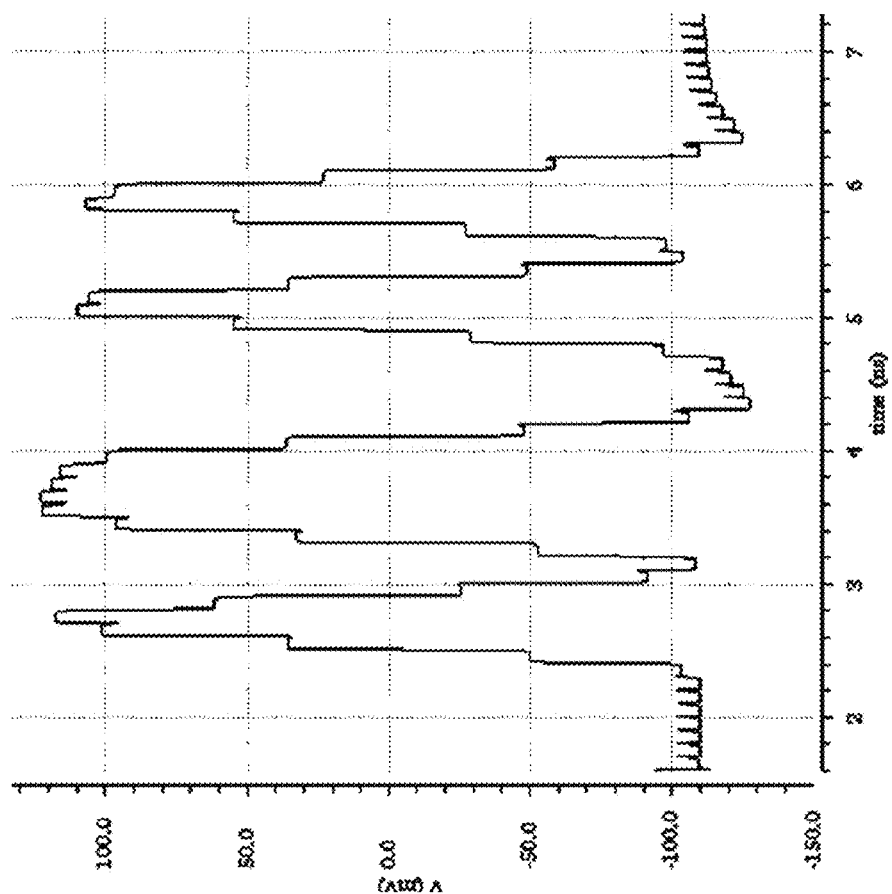
FIG. 9A is a graphic plot of simulation results based on the embodiment of FIG. 7, showing a delayed, impulse equalize, and reconstructed version of a received signal, without post-filtering.
Figure 9B:
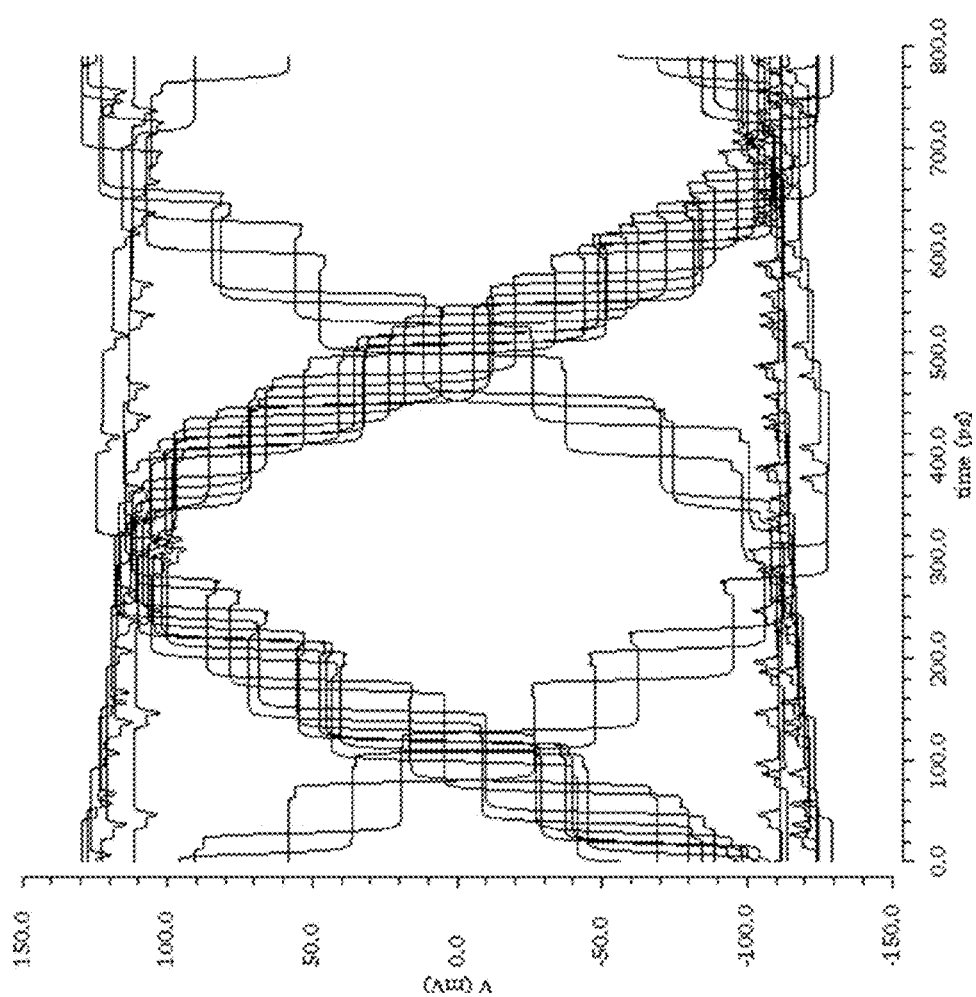
FIG. 9B is a graphic eye diagram plot of simulation results corresponding to the simulation results of FIG. 9A.
Figure 10A:
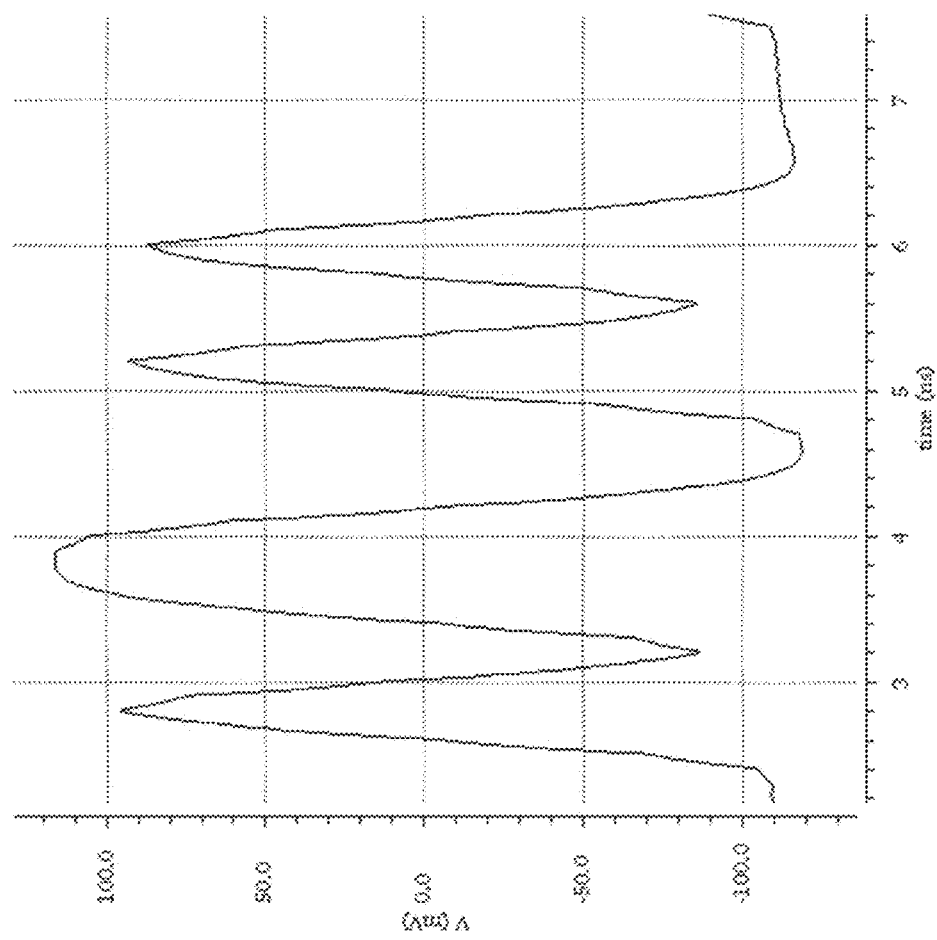
FIG. 10A is a graphic plot of simulation results based on the embodiment of FIG. 7, showing the delayed, impulse equalize, and reconstructed version of a received signal as in FIG. 9A, but with post-filtering.
Figure 10B:
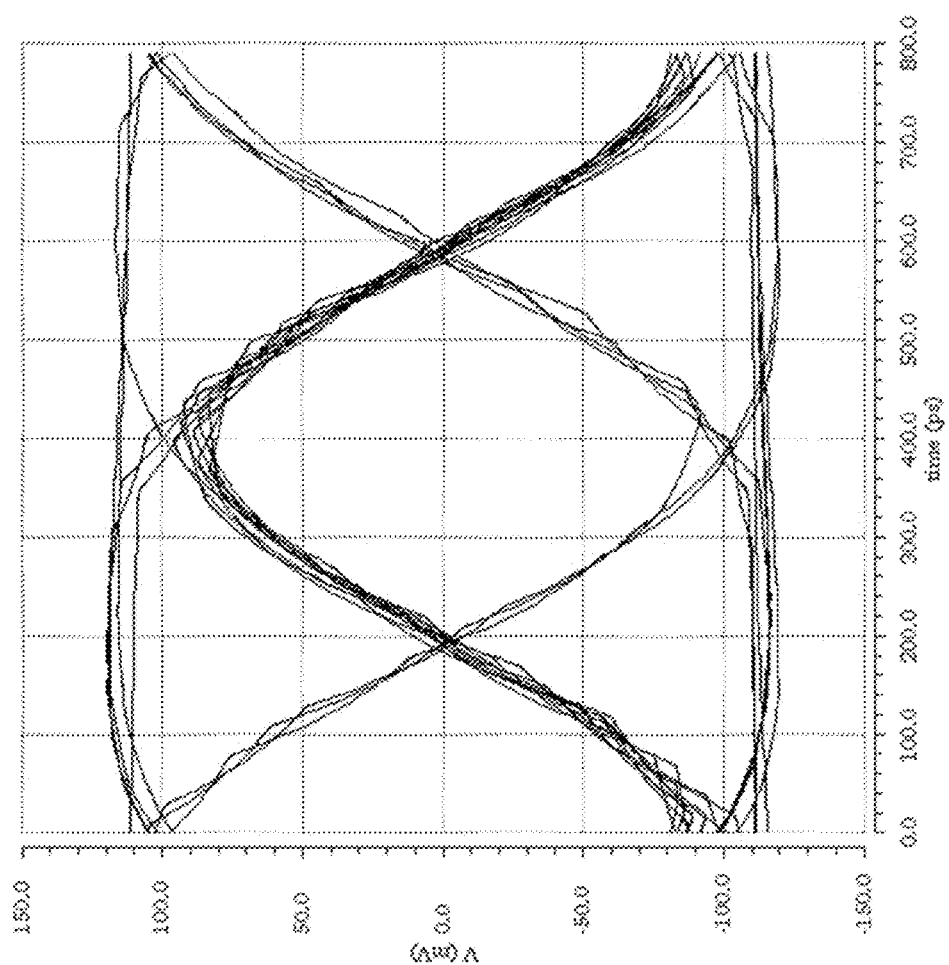
FIG. 10B is a graphic eye diagram plot of simulation results corresponding to the simulation results of FIG. 10A.

FIGS. 9A, 9B and 10A, 10B illustrate comparative waveforms and associated eye diagrams of test data signals with and without such restorative lowpass filtering. They show graphic plots of results of simulation runs through a test system employing CapFIFO receiver sections equipped much as shown in FIG. 7A, but additionally equipped with equalization measures (as described in following paragraphs). FIGS. 9A-9B show the results of an incoming test data signal, as it is oversampled, delayed, equalized, and reassembled for output. FIGS. 10A-10B show the same results as in FIGS. 9A-9B, except after being post filtered using a suitably configured RC lowpass filtering circuit.

Clearly, the sampling artifacts present in the output waveform of FIG. 9A make for a jagged waveform with squared off features indicative of quantization noise effects. This yields an eye diagram in FIG. 9B with considerable variation in plotted values. In the example shown, the discrete time nature of the oversampling carried out in the given receiver section's delay stage closes the eye by roughly two sample increments. This reflects a relatively high degree of uncertainty, due essentially the noise. The filtered waveform of FIG. 10A shows in contrast a notably smoother profile than the waveform of FIG. 9A; and, the associated eye diagram of FIG. 10B is notably more open than the eye diagram of FIG. 9B. The eye closure due to the discrete delay evident in unfiltered case of FIG. 9B is largely removed in the filtered case of FIG. 10B. The reconstructed signal which results is a highly stable, accurate, and dispersion free delayed replica of the incoming signal.

Impulse Response Equalization

Figure 11A:
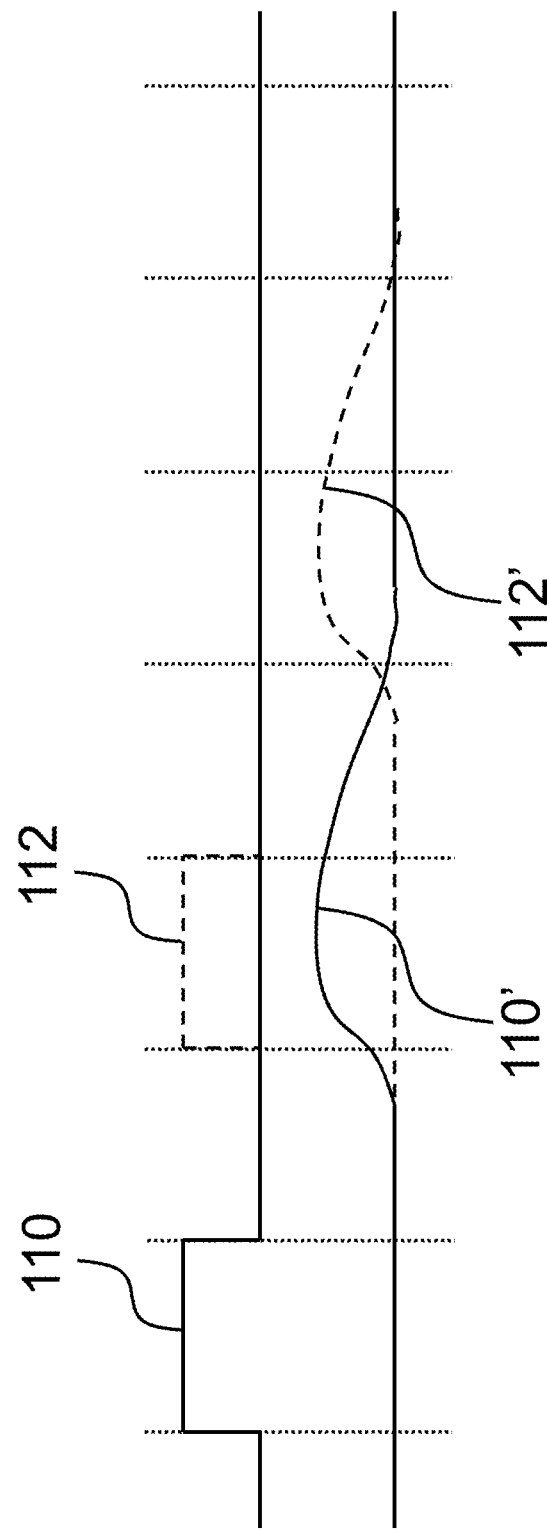
FIG. 11A is a timing diagram illustrating the channel dispersion of a transmitted signal bits causing intersymbol interference (ISI)
Figure 11B:
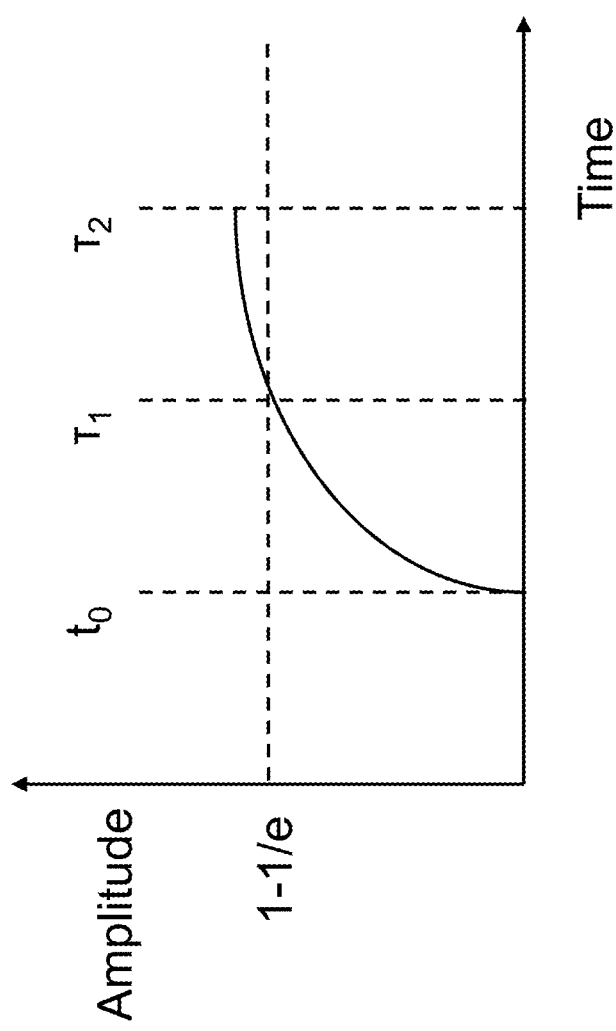
FIG. 11B is a timing diagram illustrating the step response of a non-ideal channel to a signal entering that channel.

FIGS. 11A-11B graphically illustrate the dispersive effects of a non-ideal channel on a signal transmitted therethrough. As a signal carrying digital bit pulses 110, 112 is transmitted through a channel including, for instance, low bandwidth PCB traces, it undergoes distortion. The digital bits 110, 112 enter the channel's transmission media as square pulses, but emerge at the receiving end as distorted pulses 110', 112' smeared over time due to the non-ideal frequency response of a real channel implementation. Where two bit pulses are disposed close enough in time, incomplete settling from a preceding pulse's transitions will create intersymbol interference (ISI) upon a given pulse. In other words, some portion of the preceding bit pulse remains present at the start of the next bit, such that their channel responses collide and overlap, potentially obscuring intervening bits. This is illustrated by the overlap of the smeared pulses 110', 112'.

Figure 12:
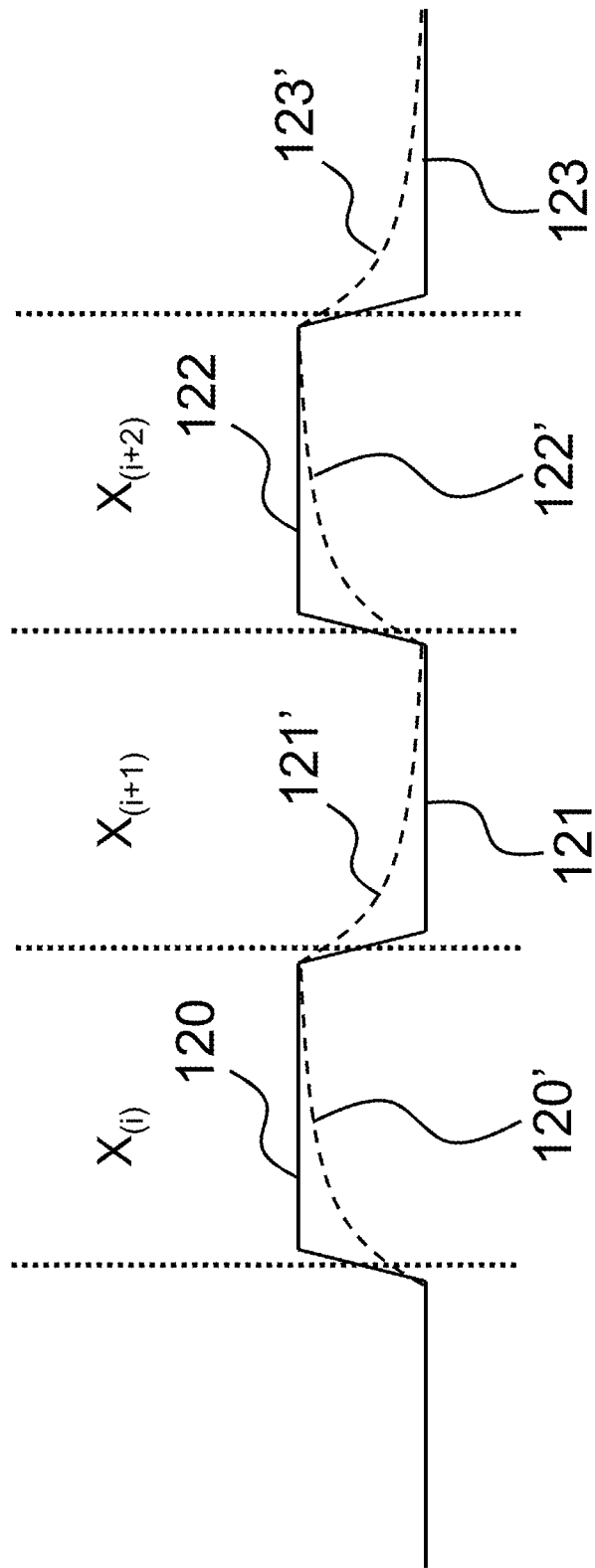
FIG. 12 is a timing diagram illustrating the smearing of signal bits during propagation through a non-ideal channel.

Non-ideal transmission channels in practice tend to exhibit considerable dispersion in this regard. As illustrated in FIG. 11B, the settling time constant of a given channel's step response to a signal entering that channel is defined as the time it takes for the channel to attain in amplitude $(1-1/e)^{th}$ of the signal's final value. Consequently, as illustrated in FIG. 12, a sequence of bit pulses 120, 122 (each spanning a UI) transmitted through a channel one UI apart will not occur entirely within their respective bit time periods X(i) and X(i+2), as ideal data bits would. Due to the channel's settling time constant, some of the energy from the first bit 120 is left behind during the following bit period X(i+1). The actual channel response to the signal is as traced by the dispersed bit pulses 120' and 122', each with residual energy 121' and 123' spilling over into the next bit period.

Figure 13:
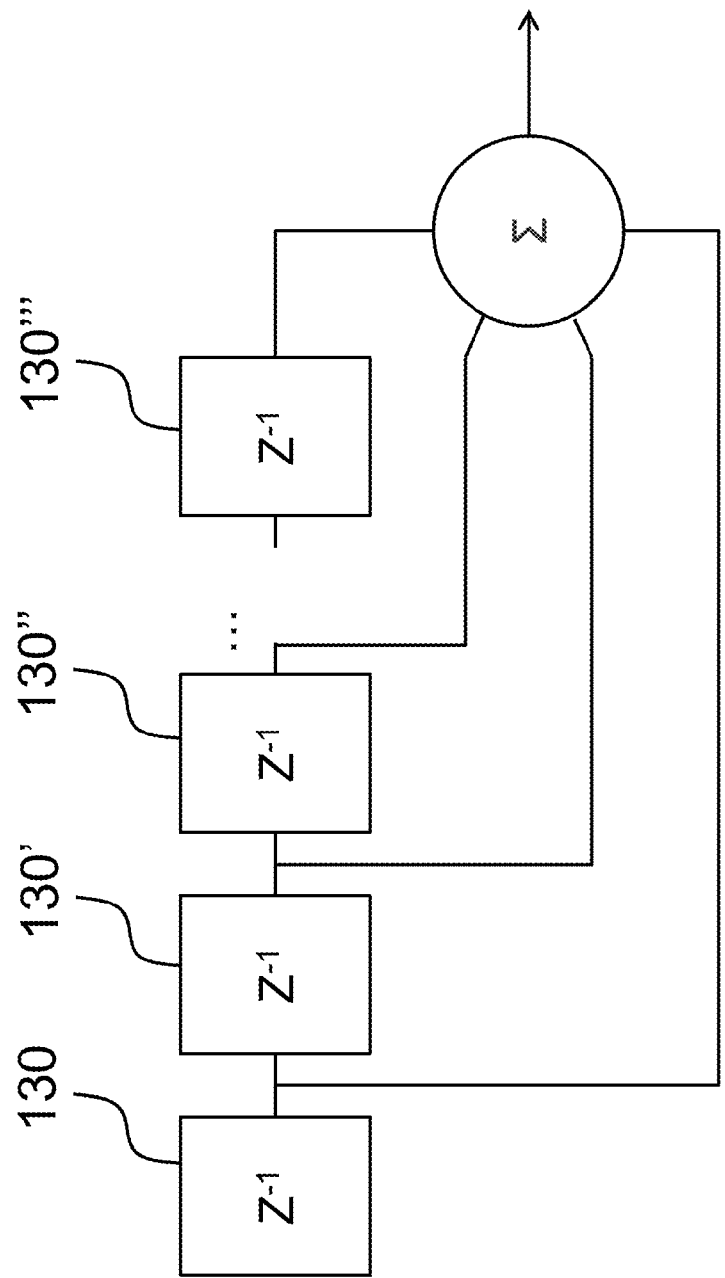
FIG. 13 is the schematic diagram illustrating a multi-order FIR filtering concept reflected in an impulse response equalization incorporated in accordance with an alternate embodiment of the present invention.

To undo this dispersive channel effect, residual energy must be removed from intervening sample periods like X(i+1), so that a bit occurring in a particular bit period correctly reflects only the data value/energy attributable to that period. Preferably, an equalization stage is incorporated into the CapFIFO receiver section 70 shown in FIG. 7A to remove such dispersive effects. The equalization stage preferably implements a finite impulse response filter (FIR) arrangement, as functionally illustrated in FIG. 13, which delays signal samples (out to a preselected order of delays 130, 130', 130'', 130''', . . . ) and sums together appropriately scaled portions of one or more previous samples (depending on the preselected order) to remove the residual energy contribution thereof from a current sample.

Figure 14:
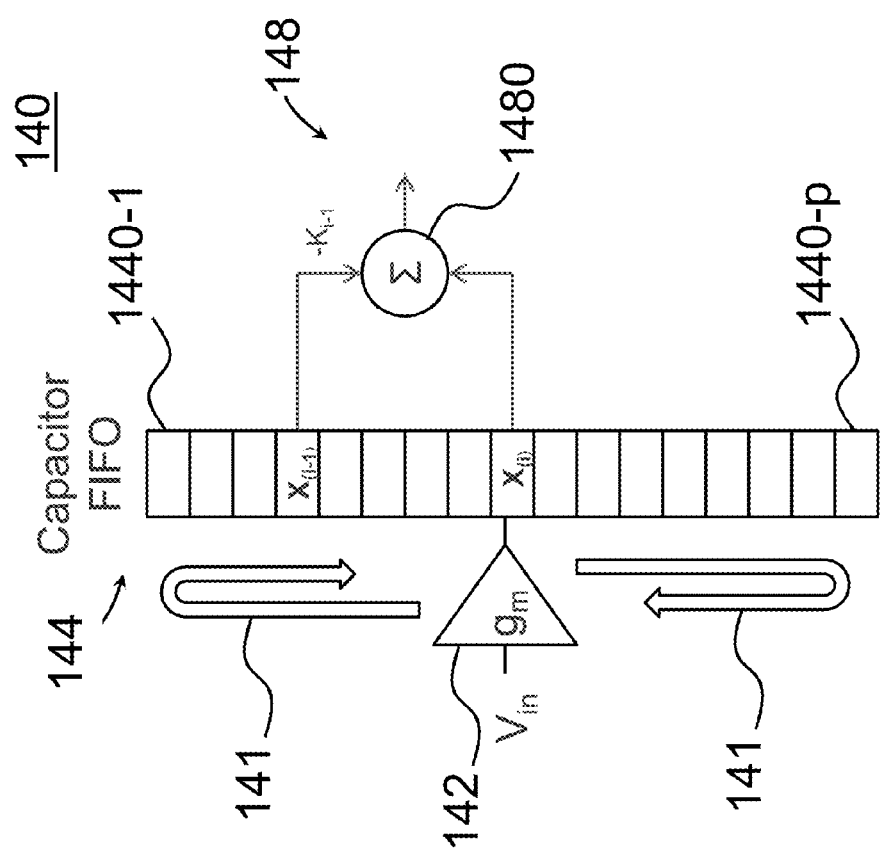
FIG. 14 is a schematic block diagram conceptually illustrating a receiver section formed in accordance with an alternate embodiment of the present invention incorporating an impulse response equalization stage in look-back configuration.

FIG. 14 illustrates in simplified schematic form an alternate embodiment of the CapFIFO receiver section 70 shown in FIG. 7A. In this embodiment, each CapFIFO receiver section 140 includes an input transconductance stage 142 (which functions as a gm charging port) and a delay stage 144 having an array of FIFO cells 1440-1 through 1440-p. While not shown in detail, each cell 1440-1-1440-p of the delay stage 144 preferably includes a set of switches by which its integrating capacitor $C_1$-$C_p$ (not shown) may be selectively addressed for alternative connection in Sample, Readout, and Reset modes, much as in the embodiment of FIG. 7A. In addition, the delay stage 144 is preferably followed by a post-filtering portion (also not shown) which lowpass filters the signal reconstructed from the delayed sample segments capacitively integrated by the delay stage 144, much as in the embodiment of FIG. 7A.

What receiver section 140 adds is an equalization stage 148 coupled to apply a look-back configuration of FIR filtering across sets of sample segments of the delay stage 144 mutually displaced by one or more UI. In the simplified example, the finite impulse response filtering is carried out to just the first order of filtering; hence, the ISI of only the closest preceding bit (occurring one UI prior) is compensated for. In alternate embodiments, the equalization stage 148 may apply higher order filtering to compensate for the ISI of additional preceding bits, as required for the particular application intended. The CapFIFO receiver section 140 is configured with enough FIFO cells to be of sufficient length to retain sample segments for several bit times (UI). An ample number p of delayed sample segments is thereby collected by the delay stage 144 to ensure that the required multiple of UI (bits) are spanned by the collected samples.

The equalization stage 148 in this embodiment includes a summer 1480 which sums the delayed sample segment value read out from the FIFO cell at bit location X(i), with the delayed sample segment value read out from the FIFO cell at the preceding bit location X(i-1) and weighted by a suitable predetermined factor—$K_{i-1}$. The residual contribution of the preceding bit (at X(i-1)) to the current bit (at X(i)) is thus removed from the current bit's sample segment in question. As indicated by the directional arrows 141, this process continues in wrap around manner for each FIFO cell 1440-1-1440-p of the delay stage 144. The CapFIFO receiver section 140 thus carries out the integrated sampling and delay, as well as equalization to remove ISI effects, to generate sample segments which may then be reassembled and post-filtered to output a precisely delayed replica of the incoming signal.

Figure 15A:
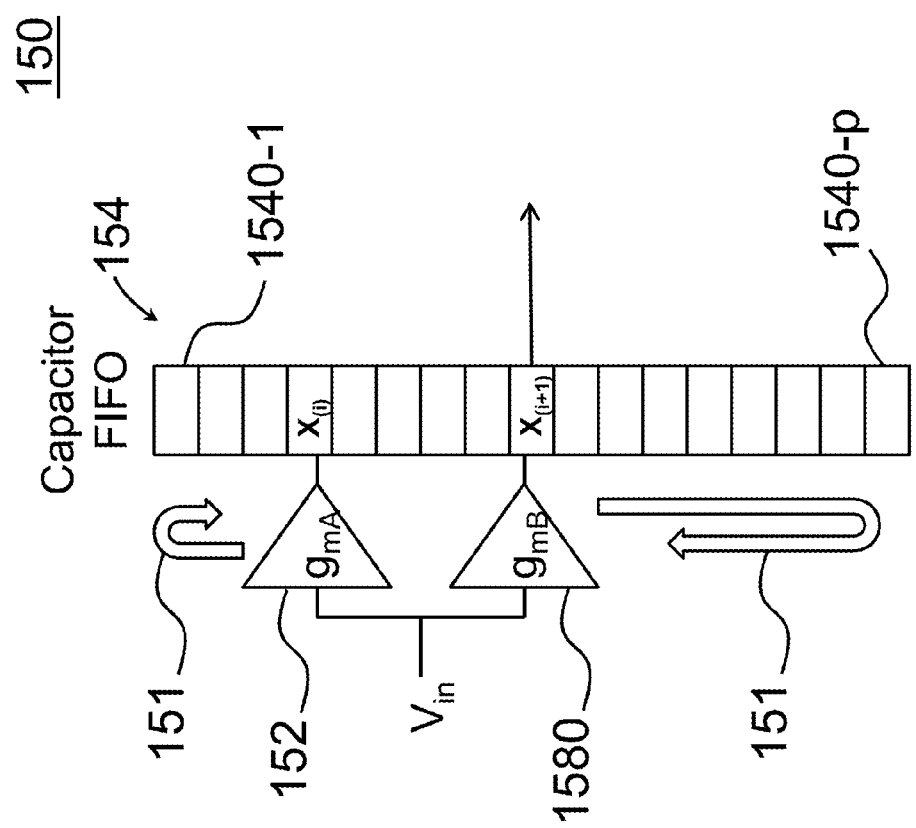
FIG. 15A is a schematic block diagram conceptually illustrating a receiver section formed in accordance with an alternate embodiment of the present invention incorporating an impulse response equalization stage in look-ahead configuration.

This impulse response equalization function may be applied conversely in look-ahead manner, on sampling rather than on readout. FIG. 15A illustrates a CapFIFO receiver section 150 similar in other respects to the CapFIFO receiver section 140 of FIG. 14, except that it incorporates an impulse response equalization stage 158 alternately having a look-ahead configuration. As shown, the CapFIFO receiver section 150 again includes a delay stage 154 having p FIFO cells 1540-1-1540-$p$, and a transconductance input stage 152 serving as a gm charging port. As a particular FIFO cell 1540 at a bit current bit time $X(i)$ is sampled by charging as usual from the gm charging port 152, the equalization stage 158 implements a second gm charging port 1580 which also precharges a look-ahead sample segment at the FIFO cell for one bit time $X(i+1)$ downstream (the next bit time) with a value scaled and inverted in suitable predetermined manner. When that sample segment at the next bit time $X(i+1)$ is subsequently sampled, the charging current adds to the value already stored in its integrating capacitor by the previous look-ahead precharge. This process continues in wrap around manner for each cell of the CapFIFO delay stage 154, as indicated by the directional arrows 151.

At readout, then, each FIFO cell 1540-1-1540-$p$ in the delay stage 154 contains an already equalized value, and may be read out directly. This look-ahead approach to equalization advantageously avoids any nonlinear summation that may arise with the look-back approach of FIG. 14. The look-back configuration prescribes equalization adjustment of each cell by the summing of the voltage value stored in its integrating capacitor with the scaled value of the voltage stored in another cell's integrating capacitor. Nonlinearities in the capacitance vs. voltage effects of different integrating capacitors would introduce error in the summation. This is a non-issue in the look-ahead configuration, since it prescribes equalization adjustment of each cell by pre-charging its own integrating capacitor before it is charged again later during its normal sampling mode. No summation with values stored by another cell's integrating capacitor is required.

Figure 15B:
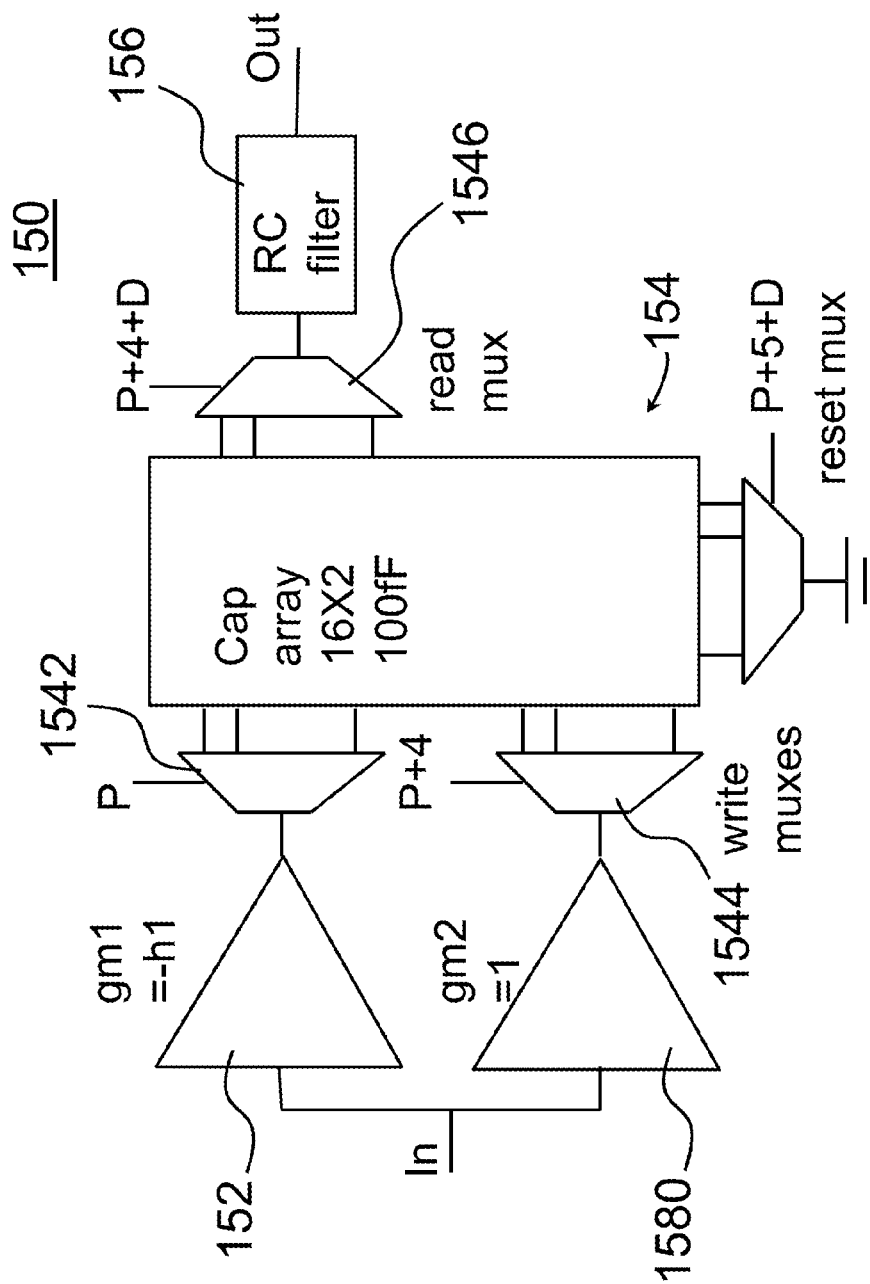
FIG. 15B is a schematic block diagram illustrating the receiver section embodiment of FIG. 15A with certain portions shown in greater detail.

FIG. 15B illustrates the CapFIFO receiver section 150 of FIG. 15A with certain portions shown in greater implementation detail. This wrap around switching indicated by the directional arrows 151 in FIG. 15A is preferably implemented in this embodiment using a set of multiplexors 1542, 1544, 1546, 1548 coupled as shown to the CapFIFO delay stage 154. The multiplexors 1542, 1544 provide the write switching to concurrently place the appropriate pair of CapFIFO cells in the sample mode. As indicated by their respective select signals P and P+4, each pair of CapFIFO cells so selected are separated by one UI, which in this particular example is four (4) clock phase increments long. Note that the actual commutation period for this CapFIFO delay stage 154 spans more than one UI, since the reset multiplexor 1548 is actuated by a select signal P+5+D occurring at the 5th switch state (following readout at the $4^{th}$ switch state) plus the selected number D of clock phase increments by which the given incoming signal is to be delayed. The read multiplexor 1546 which reads out the sample segments of the CapFIFO delay stage 154 is actuated by a select signal P+4+D occurring at the 4th switch state plus the selected delay D. The sample segments read out via the read multiplexor 1546 are then assembled and lowpass filtered by the RC post-filtering portion 156 as shown.

Leveling (on Transmit)

The compensatory signal delays necessary to correct the DQS/$DQ_n$ timing skew in the DDR memory system application illustrated herein must also be generated on transmit, for write operations. In accordance with certain aspects of the present invention, the conventional buffer delay line approach typically used for delay generation in that write leveling context is replaced by a highly accurate and reliable approach substantially free of the asynchronous sources of error intrinsic to such conventional approaches.

Timing compensation in the transmit context tends to be simpler than in the receive context (for read operations), since the outgoing strobe and data signals need not be sampled. The data signals for writing are already available in digital form to the host controller 10 which transmits them to the memory module 12. Still, the transmitter must be able to adjust the relative delay of the DQS strobe and $DQ_n$ data bits so that they arrive at the memory module 12 with their proper time relationship preserved.

In accordance with certain aspects of the present invention, a transmitter section provided for DQS strobe or $DQ_n$ data signal transmit channels preferably operates in similar fashion to a receiver section, as described in preceding paragraphs, using sub-UI (sub-bit time) clock phase increments and a FIFO delay stage. Since signal sampling is not necessary, this FIFO delay stage may employ a digital FIFO memory of any suitable type known in the art. Generally, data or strobe bits may be written to the FIFO delay stage and read out a selected time period later to generate the adjustable delay required to pre-compensate a signal in time.

FIG. 16 schematically illustrates a transmitter section 160 formed in accordance with one exemplary embodiment of the present invention. For clarity and brevity, only one transmitter section 160 is illustrated, which may serve one or more signal transmission channels. Depending on the particularly intended application, similar transmitter sections 160 may employed for one or more other signal channels, whether for transmitting strobe or data signals. The different portions of transmitter section 160 may be implemented in practice using any suitable component and device measures known in the art.

As shown, the transmitter section 160 serves to delay a digital signal generally labeled data (to irrespectively represent the bits of that signal, whether it be a DQS strobe signal or $DQ_n$ data signal) for transmission through the given channel. Like each receiver section described in preceding paragraphs, each transmitter section 160 is driven according to a high speed clock source which provides clock signals at precisely selected phase offsets. The transmitter section 160 includes in this regard a phase generation stage 162 which provides a selectively and precisely phase shifted version of a suitably supplied periodic clock signal. The transmitter section 160 further includes a delay stage 164 coupled to the phase generation portion 162 for imposing a preselected delay on the data signal responsive thereto, and an output stage 166 for appropriately gated output of the delayed signal for transmission. As with the receiver section, the preselected delay is preferably obtained by 'training' of the given system carried out beforehand using any suitable measures known in the art for appropriate channel characterization.

The phase generation stage 162 may be formed by any suitable measures known in the art. Since the host controller 10 in the DDR memory system application illustrated serves combined transceiver operations, it is already equipped with a high speed clock source for generating the precisely phase shifted clock signals required for receiver section operation. The phase generation stage 162 may conveniently share the same, which preferably employs an injection locked loop (ILL) based phased interpolator (PI), such as disclosed in U.S. Pat. No. 8,710,929. Other suitable phase generation measures known in the art, such as DLL-based measures, may be employed depending on the particular requirements of the intended application.

In the embodiment shown, the phase generation stage 162 includes an ILL portion 1620 to which a PI portion 1622 is selectively coupled by a multiplexor portion 1624. The ILL portion 1620 generally utilizes a closed ring of inverter stages using the clock signal as a reference, and makes available different phase offset versions (phases) of the clock signal between inverter stages. FIG. 17 illustrate examples of five such phases $\Phi_1$, $\Phi_2$, $\Phi_3$, $\Phi_4$, $\Phi_5$ offset from one another in phase by a predetermined clock phase increment. Ten different phases are provided, for example, in the present embodiment illustrated in FIG. 16.

The multiplexor portion 1624 is actuated responsive to a select signal input to pick off and pass to the PI portion 1622 the two phases closes to the precise phase actually required. If an intermediate phase between these two phases is required, the PI portion 1622 operates in suitable manner to precisely generate the required phase based on the two bounding phases. Preferably, a separate multiplexor portion 1624 is provided for each bit of the $DQ_n$ data and each DQS strobe signal to so control the bounding phase selection and PI for its precisely delayed readout from the FIFO delay stage 164. A selectively adjustable yet highly stable delay is thereby imposed on the signal to be transmitted. Unlike data passed through a conventional buffer delay line such as shown in FIG. 1, data stored in the digital FIFO delay stage 164 does not accumulate distortion or jitter while it is waiting to be read out.

The PI portion 1622 may be implemented in any suitable manner known in the art. FIG. 18 illustrates an exemplary embodiment of the PI portion 1622 which may be employed in the transmitter section 160. This is but one example of numerous configurations for carrying out the necessary phase interpolation.

In the embodiment shown, the PI portion 1622 receives the two closest, or bounding, phases $\Phi_m$ and $\Phi_{m+1}$ as provided by the multiplexor portion 1624. The PI portion 1622 includes corresponding sets of tri-state buffers 1622a, 1622a', eight for each set in the illustrated example. Only half—or eight, in this example—of all collective tri-state buffers in the sets 1622a, 1622a' are enabled in selected combination at any one time during system operation. The tri-state buffers 1622a, 1622a' are enabled by selectively setting the switches 1622b, 1622b', which couple the selected tri-state buffers via respective resistors 1622c, 1622c' to a sum node, as shown. An output capacitor 1622d is preferably coupled to the sum node as shown to smooth out any glitches in the interpolated phase signal, as the settings are changed during operation.

If an intermediate phase between $\Phi_m$ and $\Phi_{m+1}$ is required for output, an appropriately weighted combination of eight total buffers selected from the two bounding phases' buffer sets 1622a, 1622a' are enabled by actuating the switches 1622b, 1622b' accordingly. The relative contributions of the two bounding phases ($\Phi_m$ and $\Phi_{m+1}$ (to the interpolated phase) may be controlled thereby to range between a first extreme where all first set buffers 1622a are enabled to the exclusion of the second set buffers 1622a' (so that interpolated phase equals the bounding phase $\Phi_m$), and a second extreme where all second set buffers 1622a' to the exclusion of the first set buffers 1622a (so that interpolated phase equals the bounding phase ($\Phi_{m+1}$). In between the two extremes, the relative contributions of the two bounding phases $\Phi_m$ and $\Phi_{m+1}$ are weighted by enabling a proportional numbers of buffers (1:7 through 7:1) from the two corresponding switch sets 1622a, 1622a'. A range of intermediate phases stepped between $\Phi_m$ and $\Phi_{m+1}$ by a predetermined clock phase increment (in this case, by a clock phase increment equaling the phase difference between $\Phi_m$ and $\Phi_{m+1}$ divided by eight) may be selected for output to the digital FIFO delay stage 164.

Although this invention has been described in connection with specific forms and embodiments thereof, it will be appreciated that various modifications other than those discussed above may be resorted to without departing from the spirit or scope of the invention as defined in the appended claims. For example, functionally equivalent elements or processes may be substituted for those specifically shown and described, certain features may be used independently of other features, and in certain cases, particular locations of the elements or processes may be reversed or interposed, all without departing from the spirit or scope of the invention as defined in the appended claims.

What is claimed is:

1. A system for synchronously adjusted delay and distortion mitigated recovery of signals, comprising:
    a receiver section for incrementally sampling and delaying a signal passed through a transmission channel thereto, the signal being defined with respect to a predetermined unit interval (UI), said receiver section having a delay stage;
    said delay stage including:
        a sample storage portion having a plurality of capacitors;
        a switch portion coupled to said sample storage portion, said switch portion selectively switching said capacitors to respectively store incremental samples of the signal received through the channel, each of the incremental samples representing a segment of the same received signal, the segment spanning a predetermined fraction of one UI in time; and,
        a clock source generating a plurality of periodic clock signals progressively shifted by a predefined clock phase increment, said clock source driving said switch portion to synchronously cycle said capacitors through at least sample and readout modes of operation, the readout and sample modes being mutually offset in time by a preselected number of clock phase increments, each of said capacitors in the sample mode being charged responsive to the received signal;
        wherein the received signal is collectively reconstructed from the incremental samples of said capacitors, the reconstructed signal being delayed by the preselected number of clock phase increments.

2. The system as recited in claim 1, wherein said clock source drives said switch portion to synchronously cycle each of said capacitors through a plurality of operational modes additionally including a reset mode, each of said capacitors in said sample mode being coupled to an input node to charge responsive to the signal received thereon, each of said capacitors in said readout mode being coupled to an output node to generate one of the incremental samples of the received signal thereon.

3. The system as recited in claim 1, wherein said switch portion is driven to cycle incrementally through a plurality of switch states within a commutation period, consecutive switch states being evenly separated in time by at least one clock phase increment, each said capacitor charging over at least one clock phase increment during the sample mode thereof.

4. The system as recited in claim 3, wherein said clock phase increment spans $(1/k)^{th}$ of a UI in time, and the commutation period exceeds one UI in time to span p switch states, wherein p>k.

5. The system as recited in claim 4, wherein said sample storage portion includes for p capacitors, each set to one of the operational modes thereof at a corresponding one of said p switch states.

6. The system as recited in claim 5, wherein said switch portion includes at least first, second, and third sets of switches cycling in mutually phase offset manner through each through said p switch states.

7. The system as recited in claim 6, wherein said first, second, and third sets of switches each include corresponding sample, readout, and reset switches coupled to each of said capacitors; said sample, readout, and reset switches of each said capacitor being respectively actuated at least once during each commutation period.

8. The system as recited in claim 1, wherein said receiver section includes a transconductance input stage coupled to said delay stage, said transconductance input stage converting the signal received through the channel to a current signal.

9. The system as recited in claim 1, wherein said receiver section includes an output stage having a post-filtering portion coupled to said delay stage, said post-filtering portion selectively filtering a spectral portion of the reconstructed signal.

10. The system as recited in claim 1, wherein said commutation period spans at least two UI in time, and said receiver section includes an equalization stage coupled to said delay stage; said equalization stage applying to each incremental sample collected by said incremental sample storage portion at least one order of impulse response compensation responsive to another incremental sample displaced in time therefrom by at least one or more UI, according to the order of impulse response compensation applied.

11. The system as recited in claim 10, wherein said equalization stage executes at least a first order impulse response compensation including summing with the incremental sample collected during the readout mode of each capacitor a weighted fraction of an incremental sample collected one UI earlier by another capacitor.

12. The system as recited in claim 10, wherein said equalization stage includes at least one look-ahead transconductance input portion coupled to the channel for executing at least a first order impulse response compensation, said look ahead transconductance input portion actuating responsive to the sample mode of each capacitor to precharge a look-ahead sample to be collected by one other capacitor at least one UI later, the look-ahead sample being thereby precharged in the other capacitor to a value scaled in predefined manner.

13. The system as recited in claim 1, further comprising a transmitter section for generating delaying a signal to be transmitted through a transmission channel, said transmitter section including:
a digital first in first out (FIFO) memory stage storing and selectively releasing a signal to be transmitted;
a clock phase generation stage coupled to said digital FIFO memory and said clock source of said receiver section, said clock phase generation stage including a phase interpolator portion executing on a pair of mutually phase shifted periodic clock signals generated by said clock source to selectively establish a delay clock signal intermediately shifted in phase therebetween;
wherein the signal to be transmitted is read out from said digital FIFO memory stage responsive to the delay clock signal, the signal being thereby delayed in predefined manner for arrival at a receiving destination in time aligned manner with another signal transmitted thereto.

14. A method for synchronously adjusted delay and distortion mitigated recovery of signals, comprising:

incrementally sampling and delaying a signal passed through a transmission channel thereto, the signal being defined with respect to a predetermined unit interval (UI);

sampling and delaying a signal received through the channel;

selectively switching a plurality of capacitors to respectively store incremental samples of the signal received through the channel, each of the incremental samples representing a segment of the same received signal, the segment spanning a predetermined duration less than one UI in time;

generating a plurality of periodic clock signals progressively shifted by a predefined clock phase increment;

synchronously cycling said capacitors through at least sample and readout modes of operation, the readout and sample modes being mutually offset in time by a preselected number of clock phase increments, each of said capacitors in the sample mode being charged responsive to the received signal; and, reconstructing the received signal collectively from the incremental samples of said capacitors, the reconstructed signal being delayed by the preselected number of clock phase increments.

15. The method as recited in claim 14 wherein said synchronously cycling progresses incrementally through a plurality of switch states within a commutation period, consecutive switch states being separated from one another in time by at least one clock phase increment, each said capacitor being charged over at least one clock phase increment during the sample mode thereof.

16. The method as recited in claim 15, wherein:
said clock phase increment spans $(1/k)^{th}$ of a UI in time, and the commutation period exceeds one UI in time to span p switch states, wherein p>k;
said sample storage portion includes for each channel p capacitors, each set to one of the operational modes thereof at a corresponding one of said p switch states; and,
said synchronously cycling includes at least first, second, and third sets of switch cycling progressing in mutually phase offset manner each through said p switch states.

17. The method as recited in claim 14, wherein the signal received through the channel is transconductively converted to a current signal for said sampling and delaying; and, a spectral portion of the reconstructed signal of said delay stage is selectively lowpass filtered.

18. The method as recited in claim 14, wherein said commutation period spans at least two UI in time, and equalization is executed for each incremental sample collected by said sampling and delaying to apply at least one order of impulse response compensation to another sample displaced in time therefrom by at least one or more UI, according to the order of impulse response compensation applied.

19. A source synchronous interface system for synchronously adjusted delay and distortion mitigated recovery of transmitted signals, comprising:
a receiver for sampling and mutually time aligning data and strobe signals transmitted source synchronously thereto through respective transmission channels, each of the data and strobe signals being defined with respect to a predetermined unit interval (UI);

said receiver providing for each transmission channel a receiver section having a delay stage, said delay stage including:
- a sample storage portion having a plurality of capacitors;
- a switch portion coupled to said sample storage portion, said switch portion selectively switching said capacitors to respectively store incremental samples of the signal received through the channel, each of the incremental samples representing a segment of the same received signal, the segment spanning a predetermined duration shorter than one UI in time; and,
- a clock source generating a plurality of periodic clock signals progressively shifted by a predefined clock phase increment, said clock source driving said switch portion to synchronously cycle said capacitors through at least sample and readout modes of operation, the readout and sample modes being mutually offset in time by a preselected number of clock phase increments;

wherein the received signal is collectively reconstructed from the incremental samples of said capacitors, the reconstructed signal being delayed by the preselected number of clock phase increments for inter-channel time alignment.

20. The system as recited in claim 19, further comprising:
an output stage coupled to said delay stage, said output stage including a post-filtering portion selectively low-pass filtering a spectral portion of the reconstructed signal;
an equalization stage coupled to said delay stage; said equalization stage applying to each incremental sample collected by said sample storage portion at least one order of impulse response compensation responsive to another sample displaced in time therefrom by at least one or more UI according to the order of impulse response compensation applied; and,
a transmitter section for generating and write leveling data and strobe signals to be transmitted source synchronously through respective transmission channels, said transmitter section including for each channel:
- a digital first in first out (FIFO) memory stage storing and selectively releasing a signal to be transmitted; and,
- a clock phase generation stage coupled to said digital FIFO memory and said clock source of said receiver, said clock phase generation stage including a phase interpolator portion executing on a pair of mutually phase shifted periodic clock signals generated by said clock source to selectively establish a delay clock signal intermediately shifted in phase therebetween;

wherein the signal to be transmitted is read out from said digital FIFO memory stage responsive to said delay clock signal, the signal to be transmitted being thereby delayed in predefined manner for time alignment at a receiving destination when source synchronously transmitted with another signal thereto.

* * * * *